United States Patent
Hong et al.

(10) Patent No.: US 10,313,173 B2
(45) Date of Patent: Jun. 4, 2019

(54) METHOD AND APPARATUS FOR PERFORMING SEQUENCE SYNCHRONIZATION IN MOBILE COMMUNICATION SYSTEM

(71) Applicants: Samsung Electronics Co., Ltd, Gyeonggi-do (KR); Industry-Academic Cooperation Foundation, Yonsei University, Seoul (KR)

(72) Inventors: Daesik Hong, Seoul (KR); Wonsuk Chung, Seoul (KR); Chanhong Kim, Gyeonggi-do (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 136 days.

(21) Appl. No.: 15/500,023

(22) PCT Filed: Jul. 28, 2015

(86) PCT No.: PCT/KR2015/007841
§ 371 (c)(1),
(2) Date: Jan. 27, 2017

(87) PCT Pub. No.: WO2016/018032
PCT Pub. Date: Feb. 4, 2016

(65) Prior Publication Data
US 2017/0257249 A1    Sep. 7, 2017

(30) Foreign Application Priority Data

Jul. 28, 2014 (KR) .................. 10-2014-0095602
Apr. 1, 2015 (KR) .................. 10-2015-0046303

(51) Int. Cl.
 *H04L 5/00*   (2006.01)
 *H04L 27/26*  (2006.01)

(52) U.S. Cl.
 CPC ........ *H04L 27/2675* (2013.01); *H04L 5/0048* (2013.01); *H04L 27/261* (2013.01); *H04L 27/264* (2013.01)

(58) Field of Classification Search
None
See application file for complete search history.

(56) References Cited

U.S. PATENT DOCUMENTS 8,467,482 B2 * 6/2013 Park .................. H04H 20/30
                                                370/503
8,687,720 B2 * 4/2014 Berg ................... H04L 25/022
                                                375/259

(Continued)

FOREIGN PATENT DOCUMENTS

EP        2713542 A1     4/2014

OTHER PUBLICATIONS

International Search Report dated Nov. 25, 2015 in connection with International Application No. PCT/KR2015/007841, 4 pages.
(Continued)

*Primary Examiner* — Alpus Hsu

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention discloses a transmitting and receiving method capable of estimating an accurate time and a frequency synchronization using a sequence in a filter bank multiple transmission system.

11 Claims, 21 Drawing Sheets

(56) References Cited

U.S. PATENT DOCUMENTS

| | | | | |
|---|---|---|---|---|
| 9,178,727 | B2* | 11/2015 | Dore | H04L 25/03159 |
| 9,391,821 | B2* | 7/2016 | Li | H04L 5/0048 |
| 9,565,047 | B2* | 2/2017 | Thein | H04L 5/0051 |
| 9,596,118 | B2* | 3/2017 | Dore | H04L 27/264 |
| 2010/0183054 | A1 | 7/2010 | Daly et al. | |

OTHER PUBLICATIONS

Written Opinion of the International Searching Authority dated Nov. 25, 2015 in connection with International Application No. PCT/KR2015/007841, 10 pages.

Frank Schaich et al., "Compatibility of OFDM and FBMC Systems and Reconfigurability of Terminals", PHYDYAS Deliverable 7.1, Feb. 13, 2013, 53 pages.

Tobias Hidalgo Stitz, et al., "Pilot-Based Synchronization and Equalization in Filter Bank Multicarrier Communications", EURASIP Journal on Advances in Signal Processing, vol. 2010, Article ID 741429, Jan. 2010, 19 pages.

Christoph Thein, et al., "Frequency-Domain Processing for Synchronization and Channel Estimation in OQAM-OFDM Systems", 2013 IEEE 14th Workshop on Signal Processing Advances in Wireless Communications (SPAWC), Jun. 19, 2013, 6 pages.

Jiahui Hu, et al., "Synchronization of FBMC Based on CAZAC Sequence", IEEE, Jul. 15-17, 2011, 4 pages.

Vidar Ringset, et al., "Performance of a FilterBank MultiCarrier (FBMC) Physical Layer in the WiMAX Context", Future Network and Mobile Summit, Jun. 18, 2010, Jun. 18, 2010, 9 pages.

\* cited by examiner

[Fig. 3]
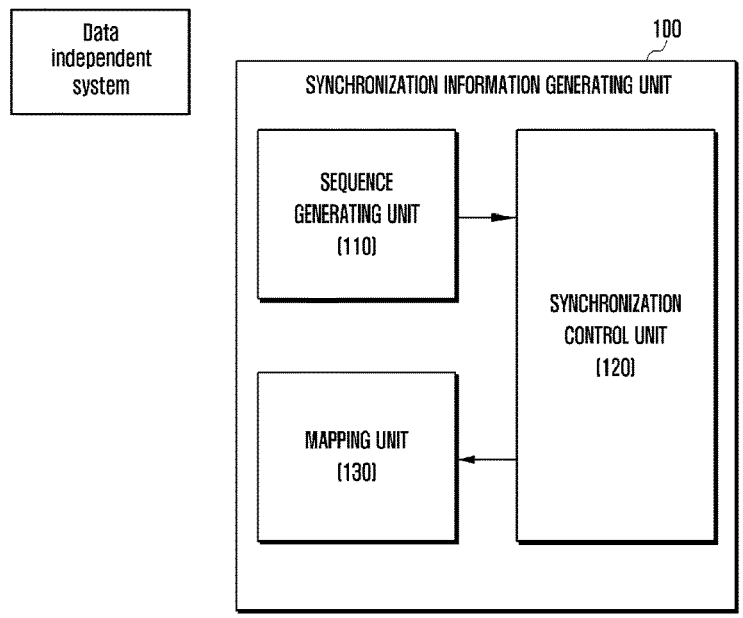
[Fig. 4]
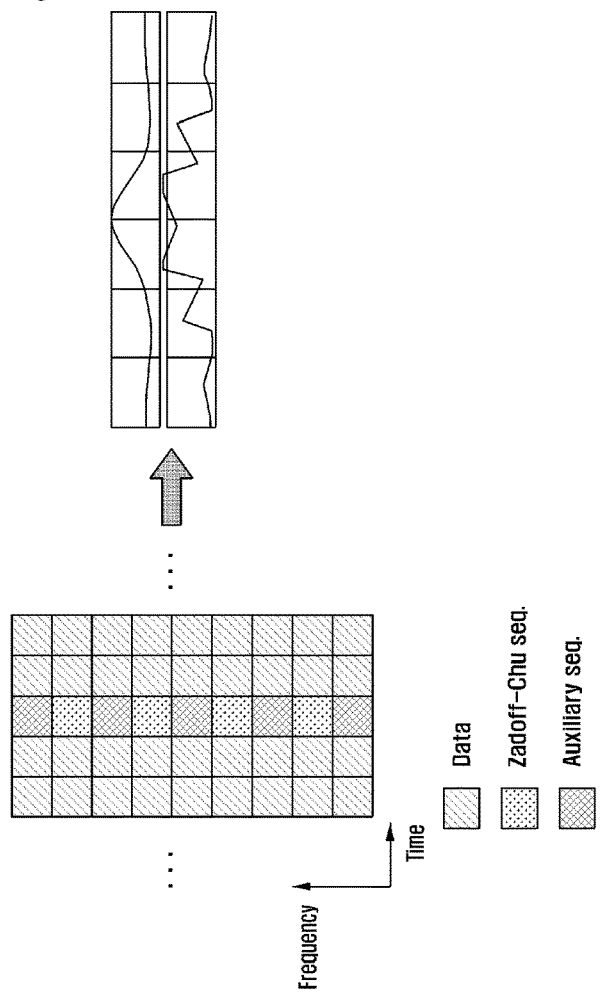

[Fig. 5]
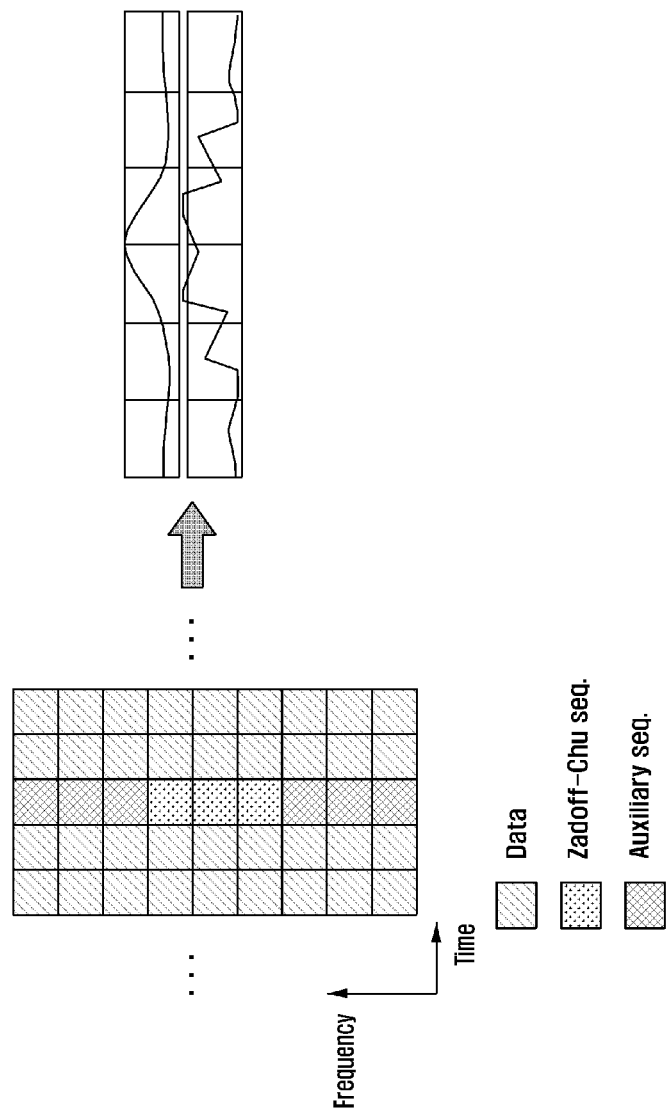

[Fig. 6]
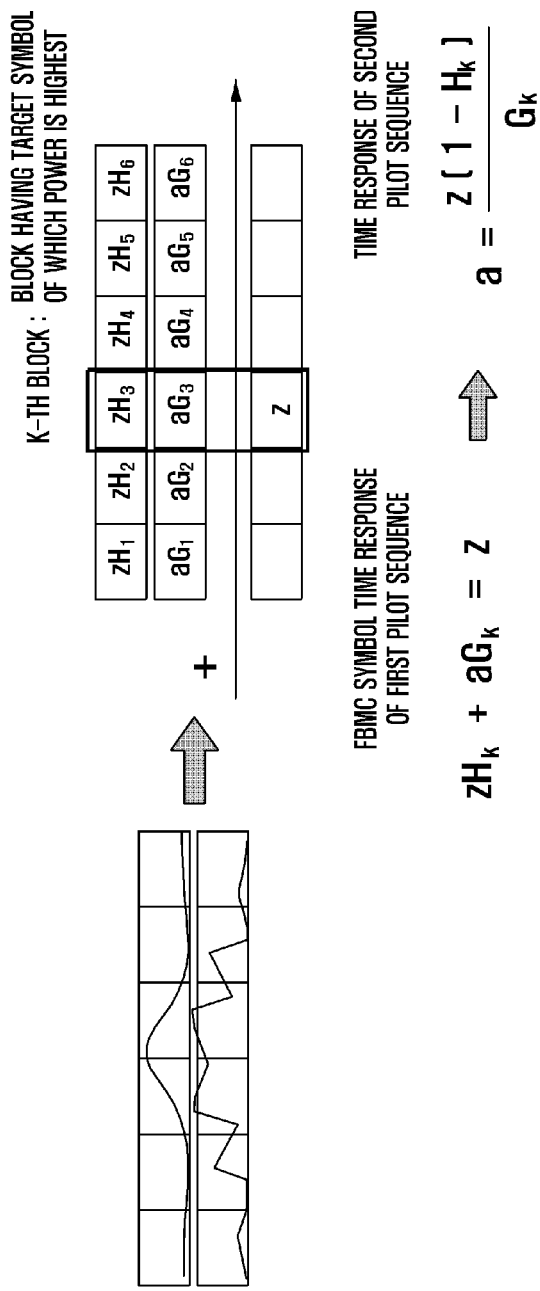

[Fig. 7]
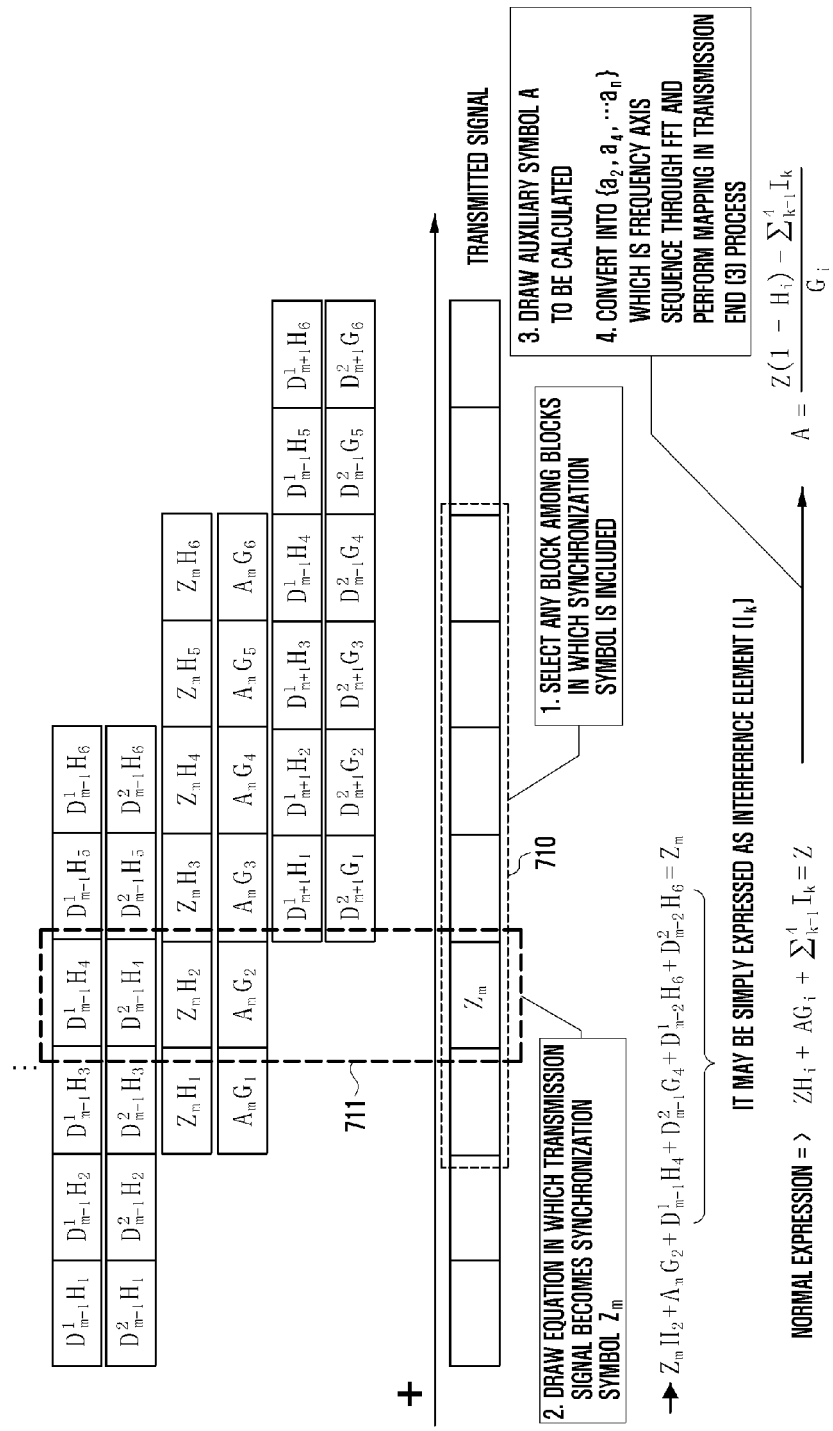

[Fig. 8]
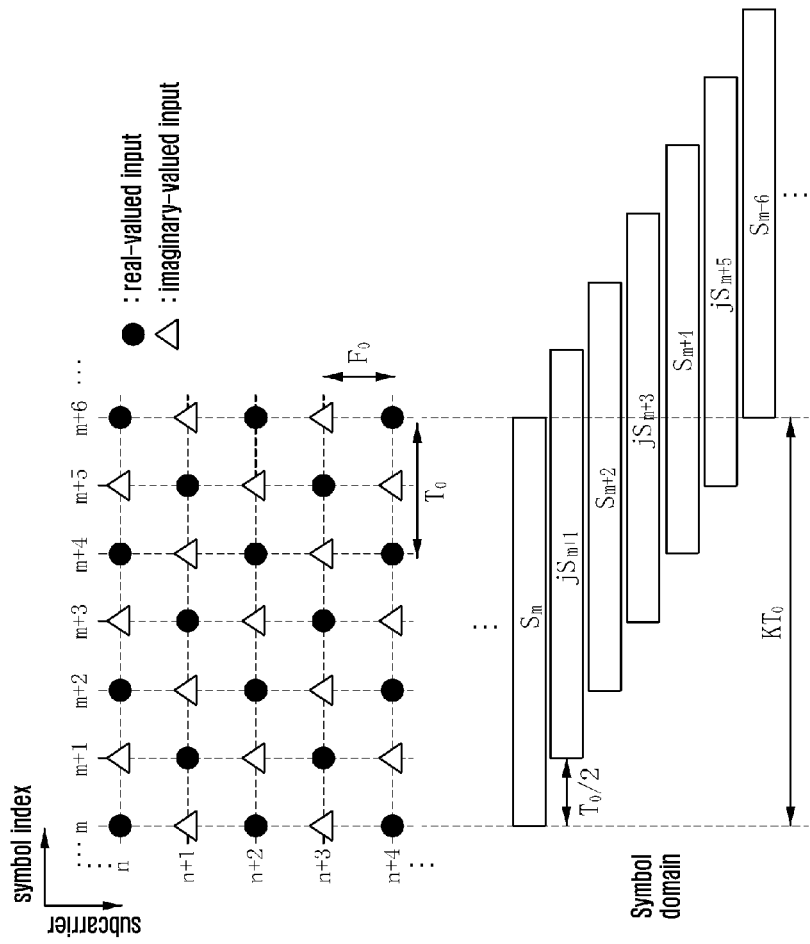

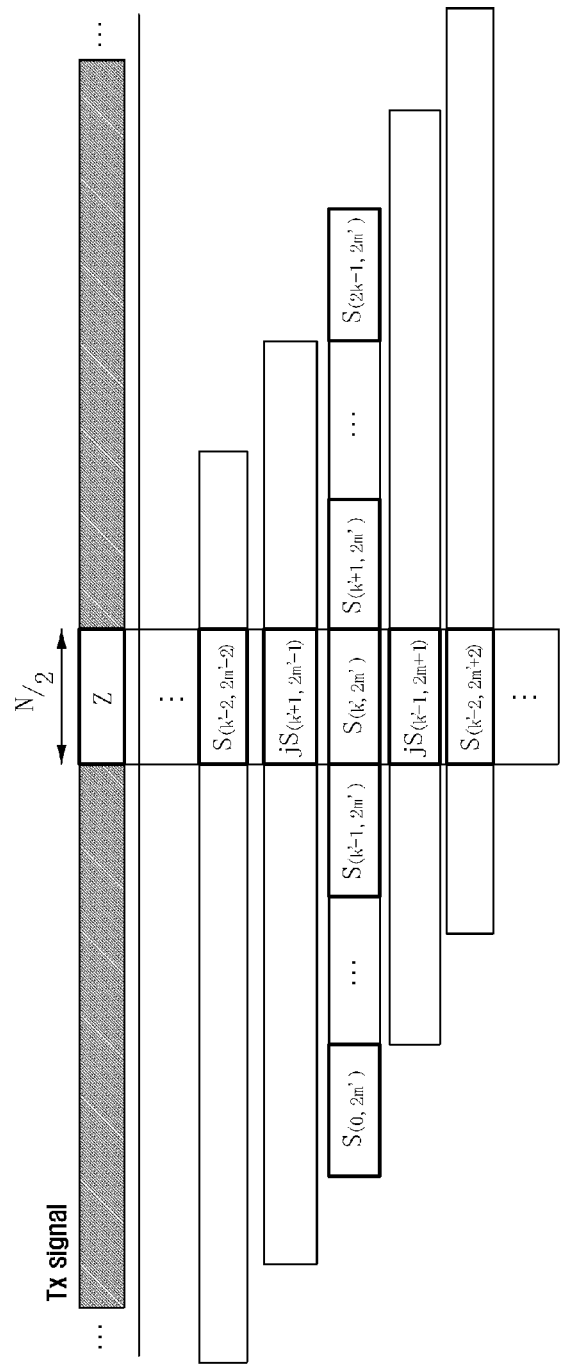
[Fig. 9]

[Fig. 10]
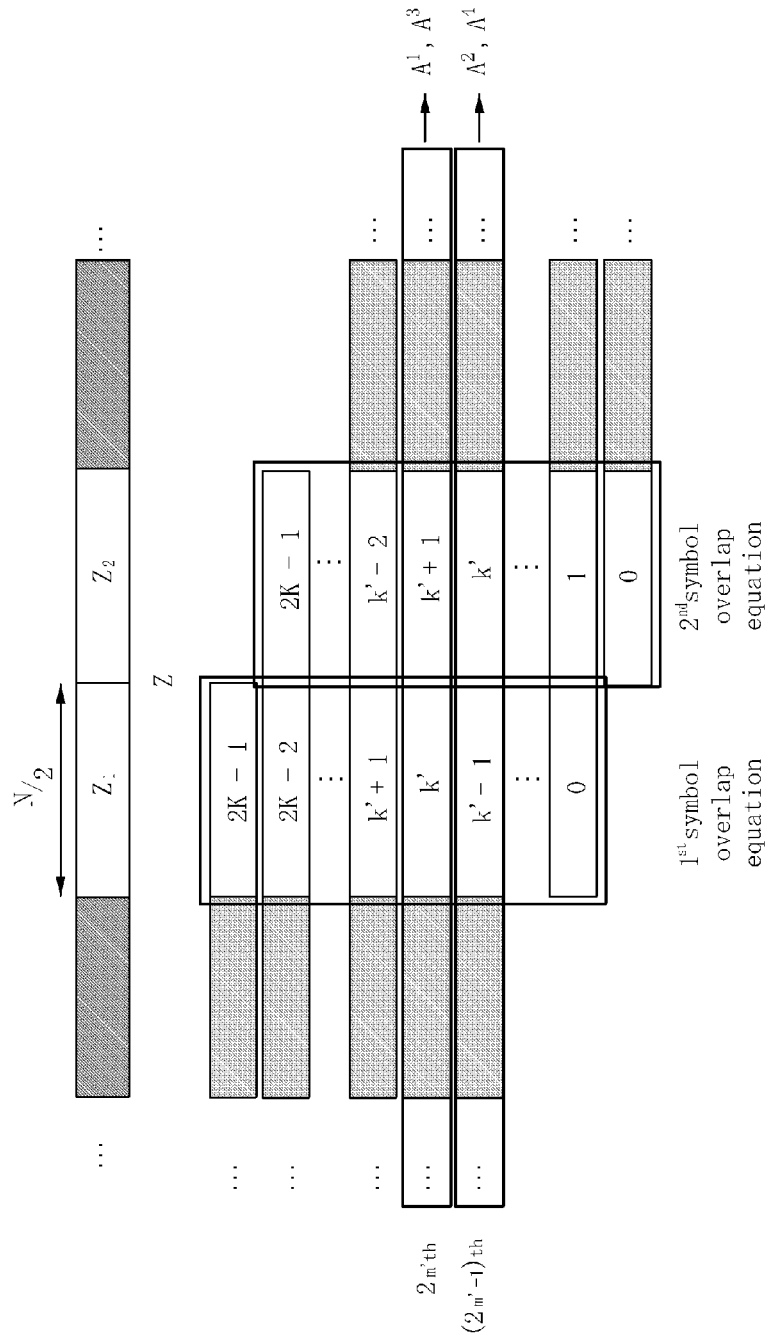

[Fig. 11]
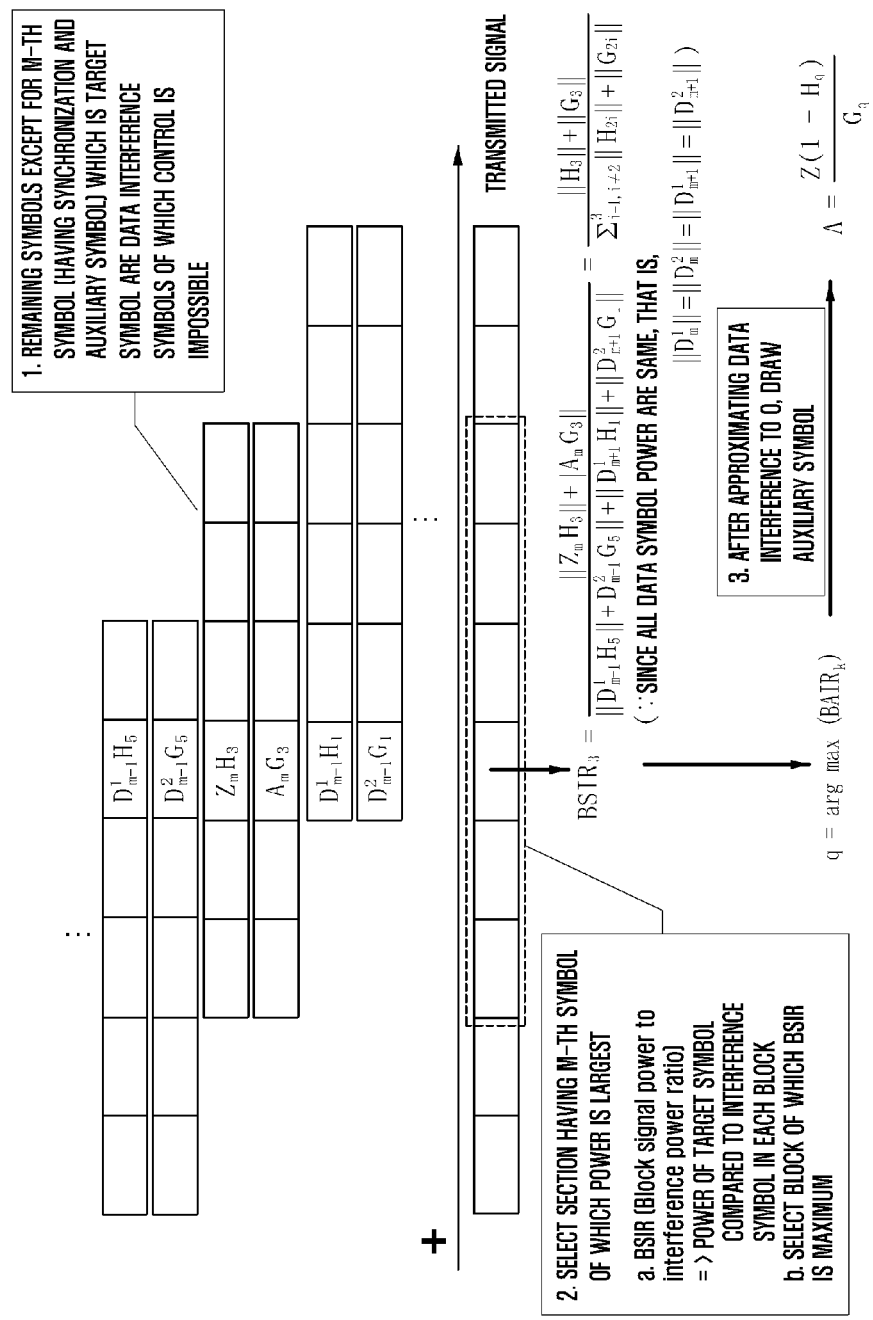

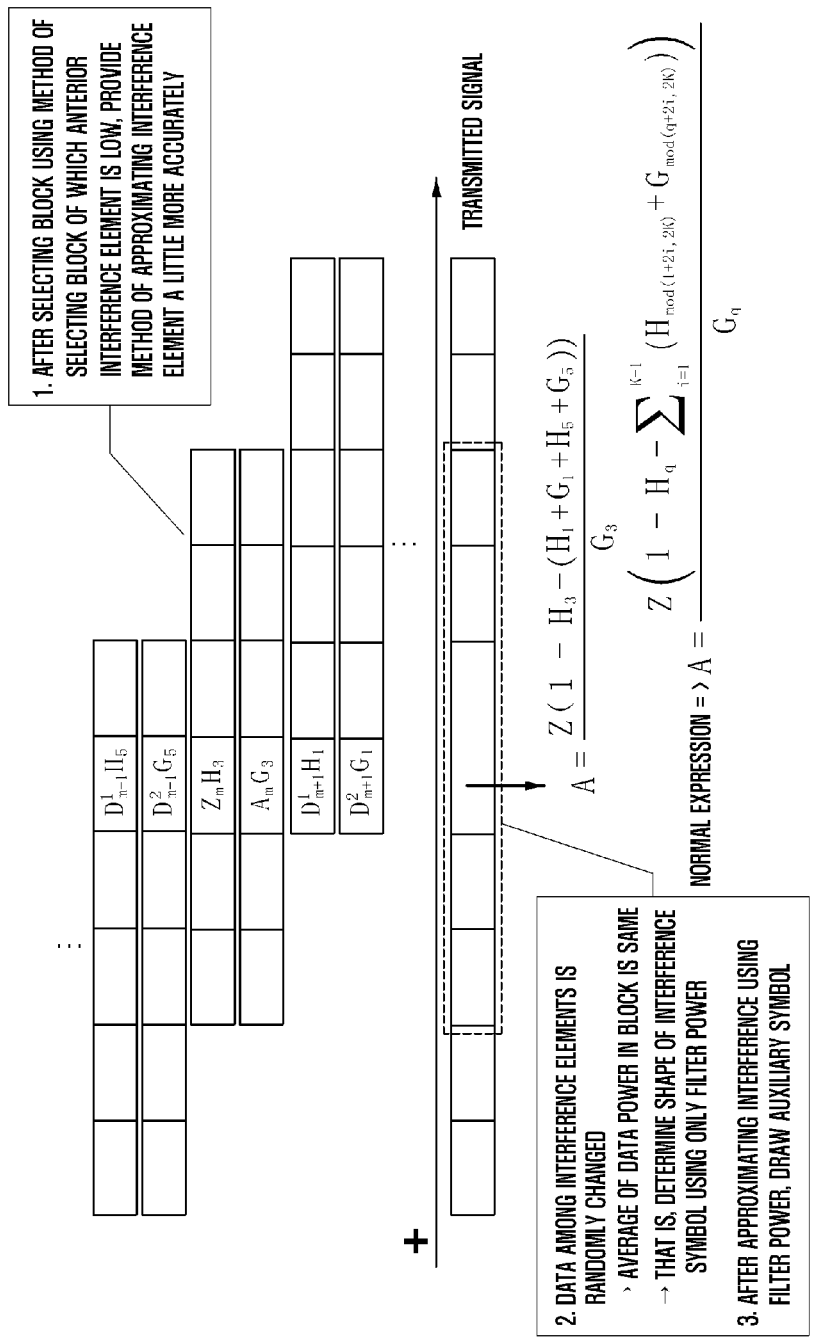
[Fig. 12]

[Fig. 13]
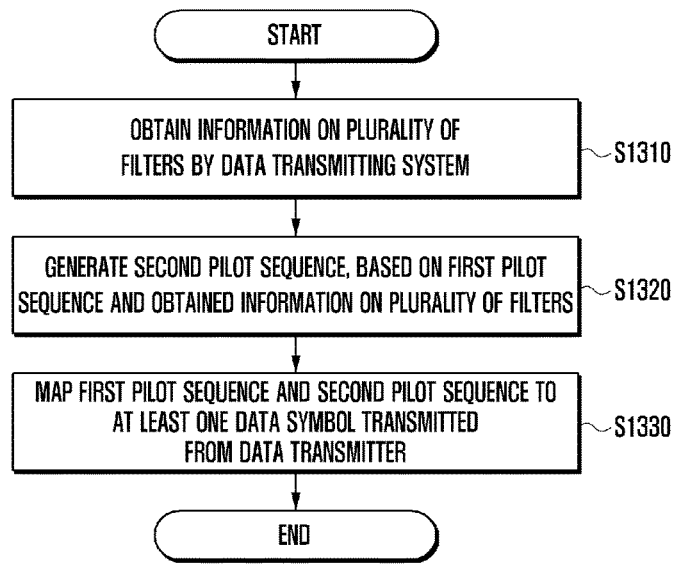
[Fig. 14]
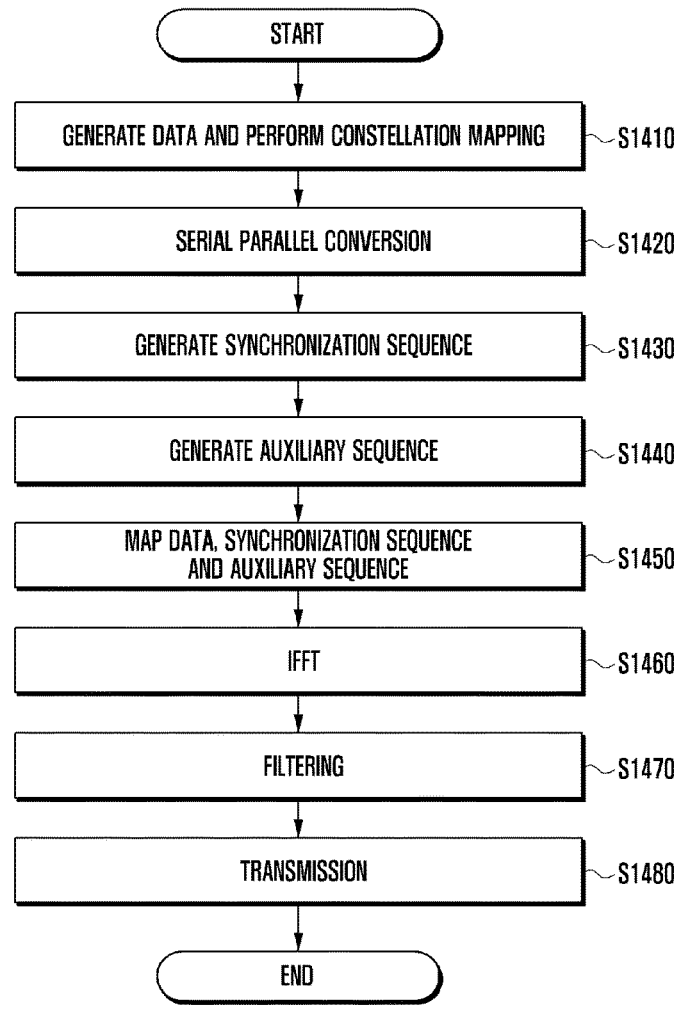

[Fig. 15a]
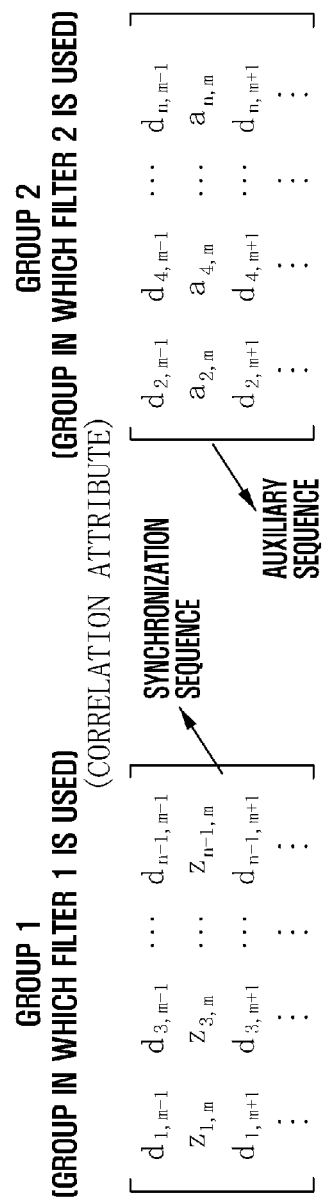

[Fig. 15b]
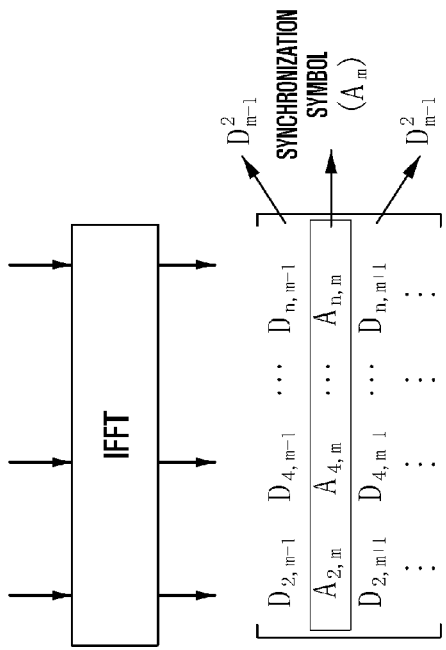
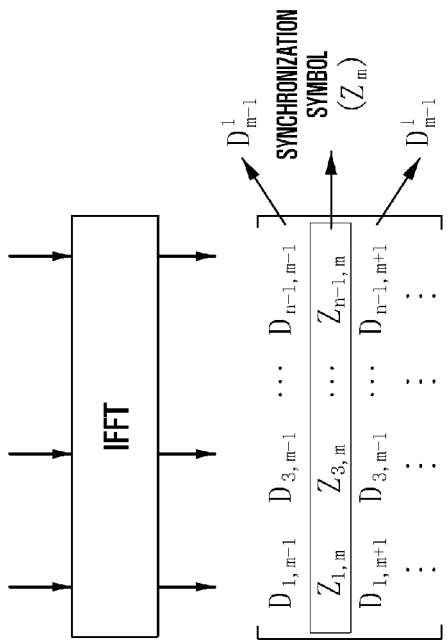

[Fig. 15c]

FILTERING
(BOTH OF FRONT AND REAR OF IFFT ARE POSSIBLE) → ATTRIBUTE OF FBMC cf) SIGNAL PROCESSING PROCESS OF FILTER (1H)
FOR RANDOM M-TH SYMBOL $$[\underbrace{D_{1,m} \quad D_{3,m} \quad \cdots \quad D_{n-1,m}}_{D_m}, \underbrace{D_{1,n} \quad D_{2,n} \quad \cdots \quad D_{n-1,m}}_{D_m}, \underbrace{D_{1,m} \quad D_{2,n} \quad \cdots \quad D_{n-1,m}}_{D_m}] \longrightarrow \text{2K UNIT}$$

$$\times \text{(MULTIPLICATION BETWEEN ELEMENTS)}$$

$$[\underbrace{\Pi_1 \quad \Pi_1 \quad \cdots \quad \Pi_{n/2}, \Pi_{n/2+1}}_{\Pi_1}, \underbrace{\Pi_{n/2+2} \quad \cdots \quad \Pi_n, \ldots, \Pi_{Kn-n/2+1}}_{\Pi_2}, \underbrace{\Pi_{Kn-n/2+2} \quad \cdots \quad \Pi_{Kn}}_{\Pi_{2K}}]$$

M-TH SYMBOL OF GROUP 1
AFTER FILTERING

| $D_m H_1$ | $D_m H_2$ | $D_m H_{2K}$ |

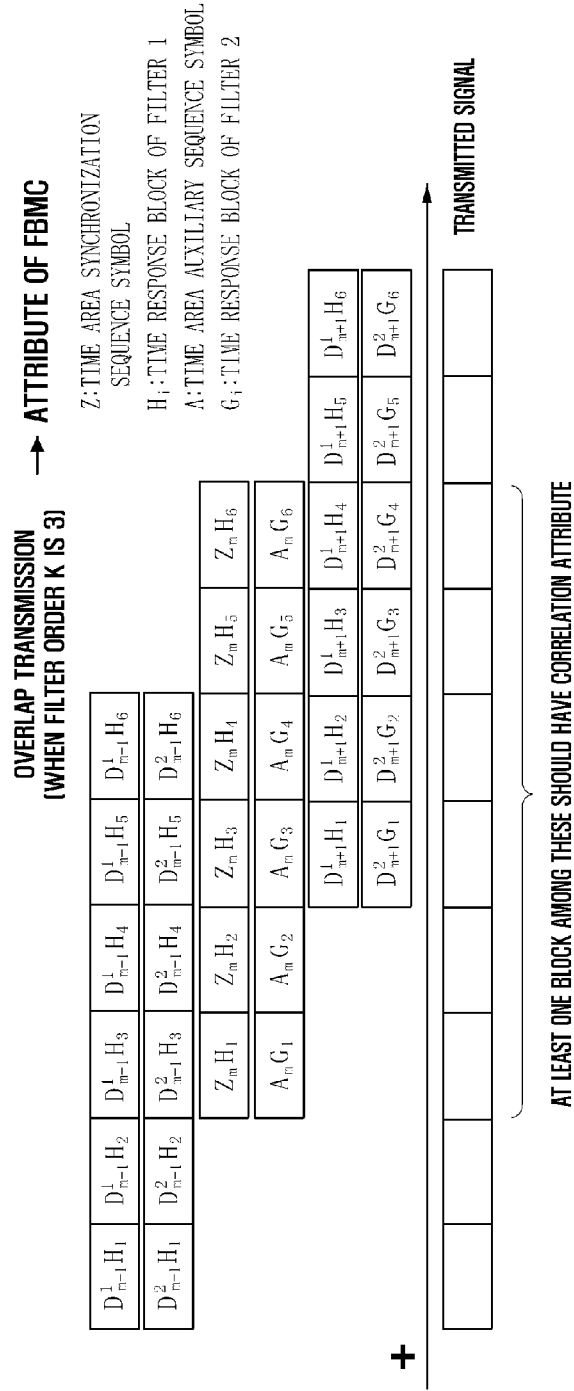
[Fig. 15d]

[Fig. 16]
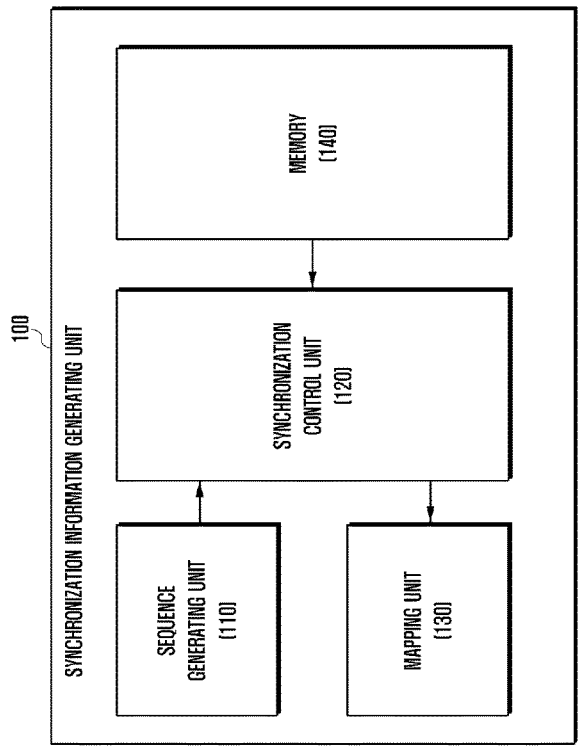
[Fig. 17]
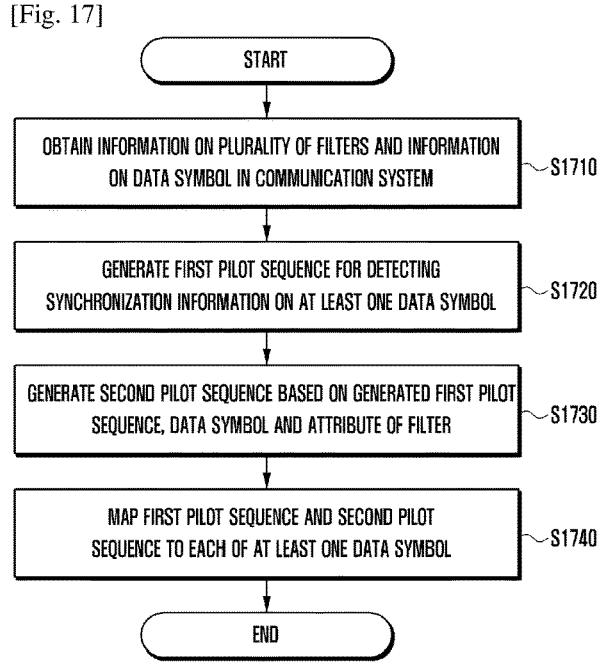

[Fig. 18]
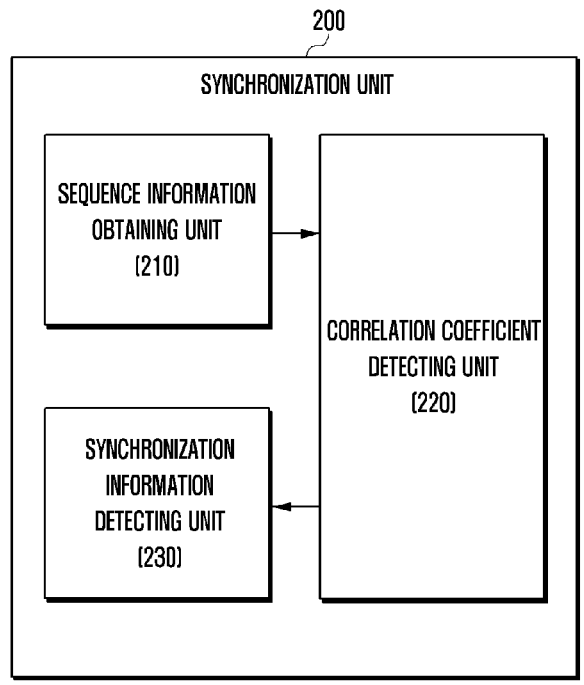
[Fig. 19]
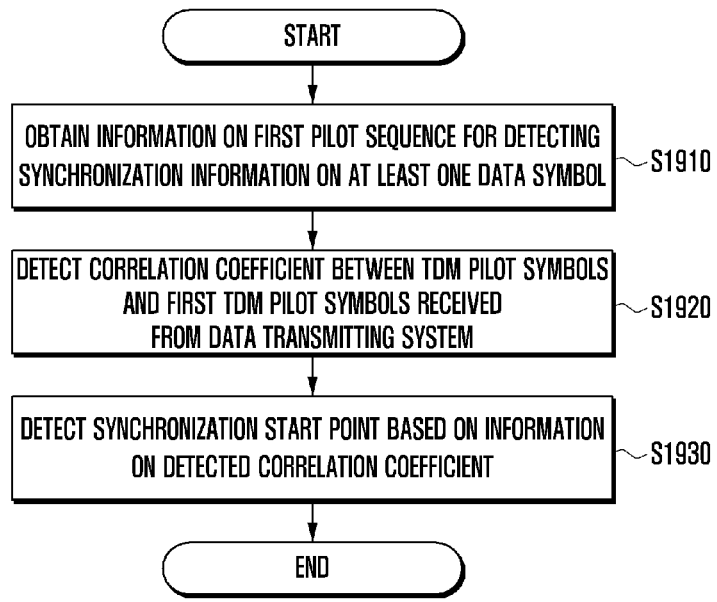

[Fig. 20]
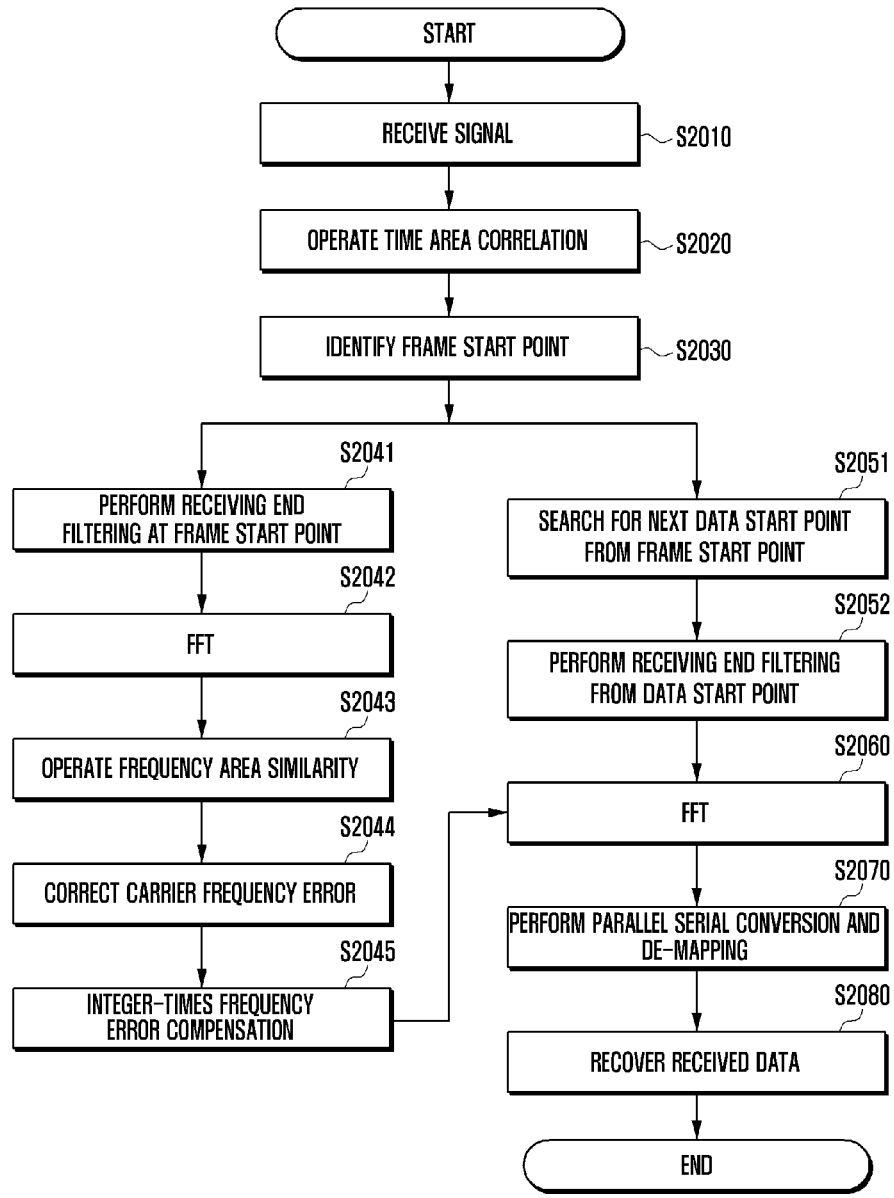

[Fig. 21]
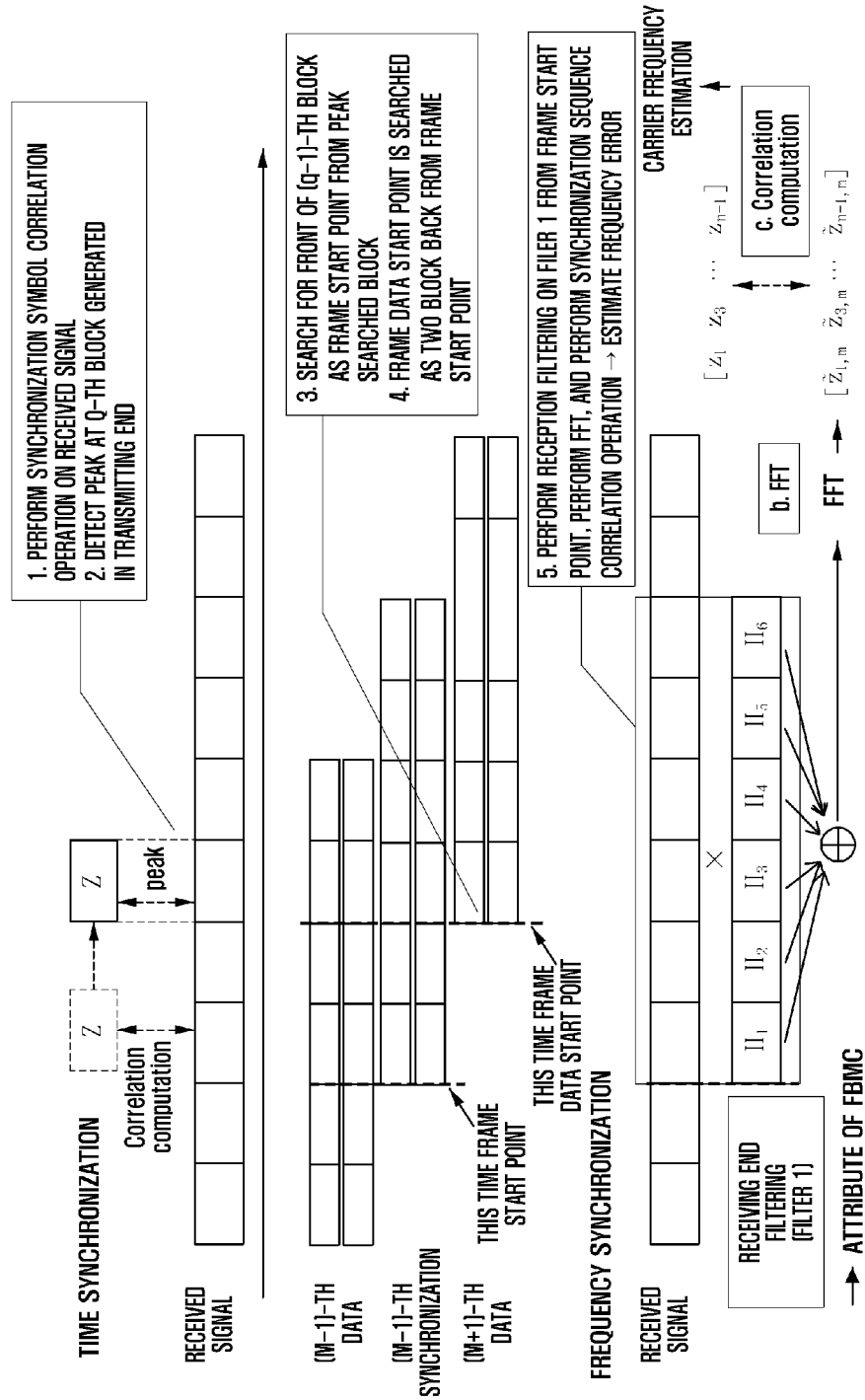

[Fig. 22]
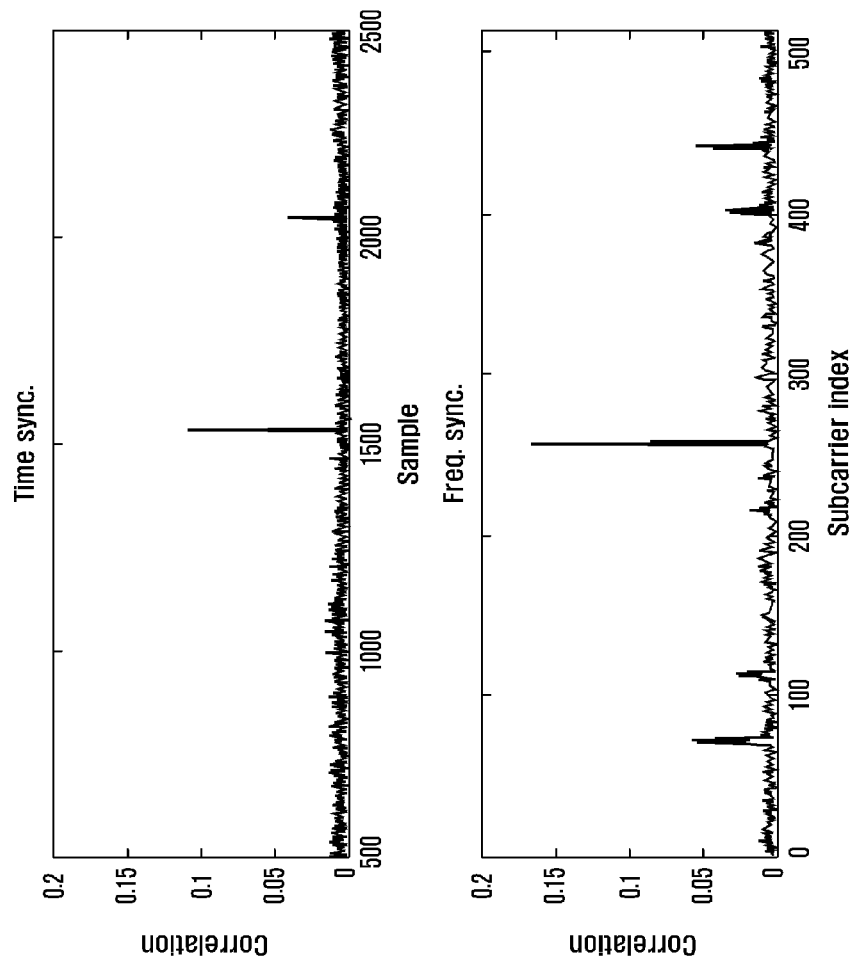

METHOD AND APPARATUS FOR PERFORMING SEQUENCE SYNCHRONIZATION IN MOBILE COMMUNICATION SYSTEM

CROSS-REFERENCE TO RELATED APPLICATION(S)

The present application claims priority under 35 U.S.C. § 365 to International Patent Application No. PCT/KR2015/007841 filed Jul. 28, 2015, entitled "METHOD AND APPARATUS FOR PERFORMING SEQUENCE SYNCHRONIZATION IN MOBILE COMMUNICATION SYSTEM", and, through International Patent Application No. PCT/KR2015/007841, to Korean Patent Application No. 10-2014-0095602 filed Jul. 28, 2014, and to Korean Patent Application No. 10-2015-0046303 filed Apr. 1, 2015, each of which are incorporated herein by reference into the present disclosure as if fully set forth herein.

TECHNICAL FIELD

The present invention relates to a method and an apparatus for performing synchronization in a mobile communication system. Specifically, the present invention relates to a method and an apparatus for performing a synchronization using a pilot sequence in a data transmitting system and a data receiving system of a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A Filter Bank Multi Carrier (FBMC) system that transmits a signal strong to a time delay and having has a small sideband (i.e., sidelobe) through a filter. The FBMC system overlaps symbols having a shape in which different filter coefficients are multiplied and a signal, and transmits the signal and symbols through a filter process.

One of a method of synchronizing a time and a frequency is a method in which, when a transmitting end transmits an appointed signal sequence, a receiving end detects this through a correlation.

In a case of an Orthogonal Frequency Division Multiplex (OFDM) system, a sequence of which a correlation attribute is good is generated and the correlation attribute is used in synchronization.

However, in the FBMC system, subcarrier signals are individually processed according to each filter, a sequence passes through a filtering process, and therefore, a correlation attribute is removed. Thus, there is a problem in which data interference is generated in a sequence for synchronization due to an overlapping transmission. Accordingly, in order to overcome a limit of a method using a sequence, which is used in the existing OFDM system, a method of generating and using a sequence of which a correlation attribute is good to use in the FBMC is requested.

DISCLOSURE OF INVENTION

Technical Problem

An aspect of the present invention is to provide a method and an apparatus for performing synchronization in a mobile communication system. Specifically, an embodiment of the present invention is to provide a method and an apparatus for performing a synchronization using a pilot sequence in a data transmitting system and a data receiving system of an FBMC system.

In addition, an aspect of the present invention is to provide a sequence of which a correlation attribute is good in an FBMC system, and thus to provide a method of mapping a signal row and operating an auxiliary sequence such that a synchronization operation is possible in the FBMC system.

Solution to Problem

According to an aspect of the present invention, a method of operating a sequence in an FBMC system comprises: mapping sequences corresponding to a plurality of filters; adopting an auxiliary sequence for maintaining a correlation attribute; drawing the auxiliary sequence to compensate interference and a filter effect.

In addition, according to an aspect of the present invention, a method of transmitting a sequence synchronization signal in a communication system may comprise: generating a first pilot sequence including first synchronization information; generating an auxiliary sequence for compensating a sequence correlation loss of the first pilot sequence; mapping the first pilot sequence and the auxiliary sequence to a plurality of subcarriers in at least one data symbol; and transmitting data to which the first pilot sequence and the auxiliary sequence are mapped.

In addition, according to an aspect of the present invention, an apparatus for transmitting a sequence synchronization signal in a communication system may comprise: a transmitting and receiving unit that communicates with at least one network node; and a control unit that controls to generate a first pilot sequence including first synchronization information, generate an auxiliary sequence for compensating a sequence correlation loss of the first pilot sequence, map the first pilot sequence and the auxiliary sequence to a plurality of subcarriers in at least one data symbol, and transmit data to which the first pilot sequence and the auxiliary sequence are mapped.

In addition, according to an aspect of the present invention, a method of receiving a sequence synchronization signal in a communication system may comprise: receiving a signal including a first pilot sequence for a synchronization signal; operating a correlation between the received signal and a time area, based on predetermined first pilot sequence information; determining a synchronization start point based on the correlation operation; and recovering data of the received signal based on the determined synchronization start point. The synchronization start point of the signal may be determined based on the first pilot sequence and an auxiliary sequence for compensating a sequence correlation loss of the first pilot sequence.

In addition, according to an aspect of the present invention, an apparatus for receiving a sequence synchronization signal in a communication system may comprise: a transmitting and receiving unit that communicates with at least one network node; and a control unit that controls to receive a signal including a first pilot sequence for a synchronization signal, operate a correlation between the received signal and a time area, based on predetermined first pilot sequence information, determine a synchronization start point based on the correlation operation, and recover data of the received signal based on the determined synchronization start point. The synchronization start point of the signal may be determined based on the first pilot sequence and an auxiliary sequence for compensating a sequence correlation loss of the first pilot sequence.

Advantageous Effects of Invention

According to an embodiment, a sequence synchronization signal may be provided in an FBMC system, and a method and an apparatus for operating a synchronization signal using the sequence synchronization signal may be provided.

According to an embodiment, a sequence may be used for a time and a frequency synchronization in an FBMC system, and a synchronization operation, which does not influence a data demodulation, may be possible.

BRIEF DESCRIPTION OF DRAWINGS

FIG. 3 is a block diagram illustrating a synchronization information generating unit in the data transmitting system 10 according to an embodiment of the present invention;

FIGS. 4 and 5 are views for describing a method of mapping a sequence to a plurality of subcarriers according to an embodiment of the present invention;

FIG. 6 is a view for describing a method of calculating attribute information of a second pilot in the synchronization information generating unit according to an embodiment of the present invention;

FIG. 7 is a view for describing a method of drawing an auxiliary sequence according to an embodiment of the present invention;

FIG. 8 is a view for describing a principle of an FBMC system using an OQAM;

FIG. 9 is a view illustrating a process of drawing the auxiliary sequence in the FBMC system using the OQAM;

FIG. 10 is a view for describing a method of drawing the auxiliary sequence without a limit of a length in the FBMC system using the OQAM;

FIG. 11 is a view for describing a method of selecting a target block of which interference element is low according to an embodiment of the present invention;

FIG. 12 is a vie for describing a method of more accurately calculating the auxiliary sequence by approximating interference element to an average value;

FIG. 13 is a flowchart for describing a method of generating synchronization information by a synchronization information generating unit according to an embodiment of the present invention;

FIG. 14 is a flowchart for describing a method of generating the synchronization information and a method of transmitting data of the present invention;

FIGS. 15A through 15D comprise views for describing a method of generating the synchronization information and a method of transmitting data according to an embodiment of the present invention;

FIG. 16 is a block diagram of the synchronization information generating unit in the data transmitting system according to an embodiment of the present invention;

FIG. 17 is a flowchart for describing a method of generating the synchronization information by the synchronization information generating unit according to an embodiment of the present invention;

FIG. 18 is a block diagram of a synchronization unit in the data receiving system according to an embodiment of the present invention;

FIG. 19 is a flowchart for describing a method of detecting a synchronization start point in the synchronization unit according to an embodiment of the present invention;

FIG. 20 is a flowchart for describing a method of detecting the synchronization start point and a method of receiving data according to an embodiment of the present invention;

FIG. 21 is a view for describing a method of detecting the synchronization start point and a method of receiving data according to an embodiment of the present invention; and FIG. 22 is graphs the synchronization start point and a synchronization frequency detected from the synchronization unit according to an embodiment of the present invention.

MODE FOR THE INVENTION

Figure 1:
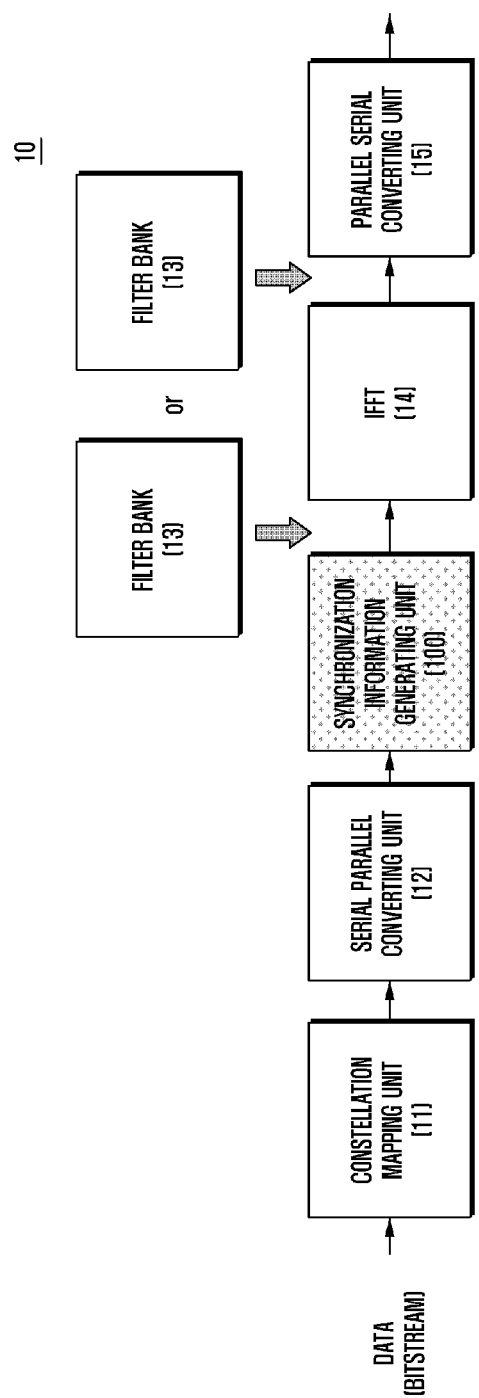
FIG. 1 is a view illustrating a block diagram of a data transmitting system in an FBMC system according to an embodiment of the present invention.

Hereinafter, various embodiments will be described with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

A following embodiment of the present invention provides a method of using a pilot sequence to estimate synchronization in an FBMC system. In an embodiment of the present invention, it is assumed that information on each filter of the FBMC system, synchronization sequence information and information on a block index forming a synchronization symbol are predetermined in a data transmitting device. The information on these may be received from a high rank node. A data receiving device may know the information on each filter of the FBMC system, the synchronization sequence information and the information on the block index forming the synchronization symbol in advance, and may receive the information on these from the data transmitting device in advance.

Hereinafter, the embodiment of the present invention will be described in detail with reference to the accompanying drawings.

FIG. 1 is a view illustrating a block diagram of a data transmitting system 10 in an FBMC system according to an embodiment of the present invention. The data transmitting system may include a constellation mapping unit 11, a serial parallel converting unit 12, a synchronization information generating unit 100, an IFFT 14, a parallel serial converting unit 15 and a filter bank 13. The data transmitting system 10 may include a base station (i.e., an eNB).

The data transmitting system 10 may generate data transmitting to the data receiving system. The data is bit type data, and may be a bit stream. The constellation mapping unit 11 modulates the bit type data to data according to each constellation. The serial parallel converting unit 12 converts a serial data row into a parallel data structure for a next operation. The synchronization information generating unit 100 generates a signal row for estimating a time and frequency synchronization. The synchronization information generating unit 100, and related operations thereof, will be described in detail through FIG. 3. A block of the filter bank 13 has an odd number filter and an even number filter for a receiving end, and operates with the signal row before or after the IFFT 14 for a signal synthesis. The parallel serial converting unit 15 converts the parallel structure of signal row output from the IFFT 14 to a serial structure. The data transmitting system 10 may transmit the converted signal to the data receiving system.

Meanwhile, in the above, the data transmitting system 10 may include a control unit controlling overall operations of the data transmitting system 10, and a transmitting and receiving unit communicating with at least one network node. At this time, the control unit may perform the operations of the constellation mapping unit 11, the serial parallel converting unit 12, the synchronization information generating unit 100, the IFFT 14, the parallel serial converting unit 15 and the filter bank 13. In the above, an embodiment of the present invention is described based on the synchronization information generating unit 100, but it is obvious that the operation of the synchronization information generating unit 100 may be performed by the control unit of the data transmitting system.

According to an embodiment, the control unit may control to generate a first pilot sequence including synchronization information, generate an auxiliary sequence for compensating a sequence correlation loss of the first pilot sequence, map the first pilot sequence and the auxiliary sequence to at least one data symbol, and transmit data to which the first pilot sequence and the auxiliary sequence are mapped. The communication system may be the FBMC system.

In addition, the control unit may control to generate the auxiliary sequence for offsetting a filter response generated in the first pilot sequence due to a plurality of filters.

In addition, the control unit may control to select a random block among a plurality of blocks in which the first pilot sequence is included, and determine an auxiliary symbol of the auxiliary sequence such that a transmission signal becomes a synchronization symbol of the first pilot sequence. At this time, the control unit may select a block of which a transmission power value of a target pilot sequence among the plurality of blocks is largest as the random block.

In addition, the control unit may control to map the first pilot sequence to a specific filter and map the auxiliary sequence to a filter different from the specific filter.

In the above, the data transmitting device according to an embodiment of the present invention has been briefly described. But, the operations and functions of the data transmitting device are not limited this, the data transmitting device may perform operations according to an embodiment of the present invention, which will be described through FIGS. 3 to 19.

In addition, the mobile communication system may be a Filter Bank MultiCarrier (FBMC) system based on an Offset Quadrature Amplitude Modulation (OQAM). In this case, the control unit may control to map a pair of auxiliary sequences to the plurality of subcarriers, based on a signal mapping method of the OQAM.

In addition, the control unit may control to determine the number of the auxiliary sequences according to a length of the synchronization signal, and map the determined auxiliary sequence to the plurality of subcarriers based on the signal mapping method of the OQAM.

Input values mapped to each subcarrier may be configured such that a phase difference between an adjacent subcarrier and an adjacent symbol corresponds to $\rho/2$ as a real number and an imaginary number according to the signal mapping method of the OQAM. At this time, an even number filter and an odd number filter may use the same filter.

Referring to FIG. 1, a transmission signal of the FBMC system is formed through the following structure. Each of modulated N signal rows ($a^{(m)}$) forming m-th symbol are divided into an odd number signal row ($a_o^{(m)}$) and an even number signal row $a_e^{(m)}$. After increasing a sampling frequency K times with respect to each signal row ($a_o^{(m)}$ and $a_e^{(m)}$), an Inverse Fourier Transform (IFFT) is performed, a signal waveform in which a converted signal row ($A_o^{(m)}$ and $A_e^{(m)}$) is repeated 2K times is generated. When each odd number filter ($H_o$) and even number filter ($H_e$) of which filter coefficients is K is multiplied to the generated two waveforms, each of odd number symbol and even number symbol is formed. The odd number symbol and the even number symbol are added, and thus the m-th symbol is formed.

Figure 2:
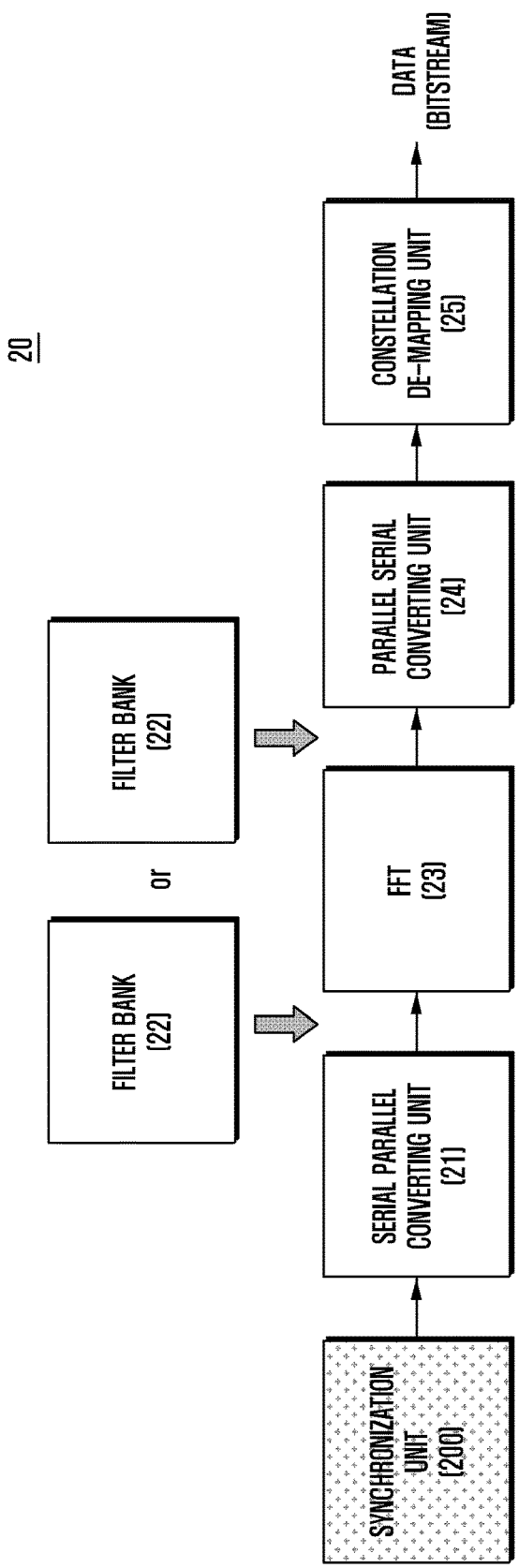
FIG. 2 is a view illustrating a block diagram of a data receiving system in the FBMC system according to an embodiment of the present invention.

FIG. 2 is a view illustrating a block diagram of a data receiving system 20 in the FBMC system according to an embodiment of the present invention. The data receiving system 20 may include a synchronization unit 200, a serial parallel converting unit 21, an FFT 23, a parallel serial converting unit 24, a constellation de-mapping unit 25 and a filter bank 22. The data receiving system 20 may include an electronic device, a terminal, and the like for supporting an FBMC communication method.

The data receiving system 20 may receive the signal transmitted from the data transmitting system 10. The synchronization unit 200 may estimate a time and frequency synchronization for the received signal, using the signal row generated from the synchronization information generating unit 100. A configuration and an operation of the synchronization unit 200 will be described in detail with reference to FIGS. 15A-D (collectively, "FIG. 15"). The serial parallel converting unit 21 and the parallel serial converting unit 24 act the same as the serial parallel converting unit 12 and the parallel serial converting unit 15 of FIG. 1. A block of the filter bank 22 has an odd number filter and an even number filter for a receiving end, and operates with a signal row before or after a block of the FFT 23 for signal decomposition. The constellation de-mapping unit 25 demodulates data into a bit type according to a constellation.

Meanwhile, in the above, the data receiving system 20 may include a control unit controlling overall operation of the data receiving system 20 and a transmitting and receiving unit communicating with at least one network node. At this time, the control unit may perform the operations of the synchronization unit 200, the serial parallel converting unit 21, the FFT 23, the parallel serial converting unit 24, the constellation de-mapping unit 25 and the filter bank 22 in the data receiving system 20.

According to an embodiment of the present invention, the control unit may control to receive a signal including a first pilot sequence for a synchronization signal, operate a correlation between the received signal and a time area, based on predetermined first pilot sequence information, determine a synchronization start point based on the correlation operation, and recover data of the received signal based on the determined synchronization start point. At this time, the synchronization start point of the signal may be determined based on the first pilot sequence and an auxiliary sequence for compensating a sequence correlation loss of the first pilot sequence. In addition, at this time, the system may be the FBMC system. The auxiliary sequence may offset a filter response generated in the first pilot sequence due to the plurality of filters.

In the above, the data receiving device according to an embodiment of the present invention has been briefly described. But, the operations and functions of the data receiving device are not limited to this. The data receiving device may perform operations for identifying a synchronization signal and recovering data according to a synchronization method.

FIG. 3 is a block diagram illustrating the synchronization information generating unit 100 in the data transmitting system 10 according to an embodiment of the present invention. In the synchronization information generating unit 100 shown in FIG. 3, only configuration elements related to the present embodiment are shown. Thus, a person having an ordinary skill in a technical field related to the present embodiment may understand that other common configuration elements in addition to the configuration elements shown in FIG. 3 may be included. In addition, in the above, the synchronization generating unit 100 is divided into a sequence generating unit 110, a synchronization control unit 120 and a mapping unit 130, and is described, but the synchronization generating unit 100 is not limited thereto. The synchronization information generating unit 100 may control overall operation as one control unit.

Referring to FIG. 3, the synchronization information generating unit 100 may include the sequence generating unit 110, the synchronization control unit 120 and the mapping unit 130.

The sequence generating unit 110 generates a data symbol including at least one piece of synchronization information transmitted from the data transmitting system 10 to the data receiving system 20. Here, the synchronization information may include a plurality of pilot sequences. In the present specification, for convenience, a first pilot sequence and a second pilot sequence are described as an example of the plurality of pilot sequences.

According to an embodiment, Zadoff-chu sequence may be used in the first pilot sequence. But, Zadoff-Chu (ZC) sequence is only an embodiment of the present invention, and various types of sequences used for synchronization detection in the existing communication system may be variously used.

When N data symbols are included in a data sequence, for example, Zadoff-chu sequence may include N pilot symbols generated based on the following Equation 1.

$$x_u(n) = e^{-j\frac{\pi u n(n+1+2q)}{N_{ZC}}}$$ [Equation 1]

Here, $H_{ZC}$ means a length of a sequence.

Meanwhile, the sequence generating unit 110 may generate the second pilot sequence in consideration of an attribute of the first pilot sequence. When the pilot sequence is used in the FBMC system, if the pilot sequence passes through a filter bank, an original attribute of the pilot sequence may be lost due to an effect of the filter. For example, when the first pilot sequence is Zadoff-chu sequence, if the first pilot sequence passes through the filter bank, an attribute of constant amplitude zero autocorrelation disappears. In addition, the first pilot sequence is interfered from an adjacent symbol. In this case, it is difficult for the receiving system 20 to accurately detect a synchronization start point, and thus performances of the transmitting system 10 and the receiving system 20 may be degraded. Thus, in order to solve such a problem, the sequence generating unit 110 according to an embodiment of the present invention may additionally generate an auxiliary sequence for offsetting a loss of an attribute, which is generated due to the first pilot sequence passing through the filter bank. The auxiliary sequence may be the second pilot sequence. The second pilot sequence may be generated in consideration of the first pilot sequence passing through the filter bank and an attribute for compensating the interference from the adjacent symbol An attribute of a sequence correlation uses an attribute in which a similarity between oneself and the same sequence is 1 and a similarity between oneself and a different sequence is 0, and is effective in estimating synchronization. In the present invention, as described above, two types of pilot sequences may be used. The first pilot sequence may be a synchronization sequence. The first pilot sequence is a sequence capable of directly estimating synchronization using a self correlation attribute. The second pilot sequence or the auxiliary sequence is used together with the first pilot sequence, and is a sequence to help the first pilot sequence maintains the correlation attribute in a time area.

Meanwhile, in order to generate the second pilot sequence for offsetting a loss of an attribute, which is generated due to the first pilot sequence passing through the filter bank, all values of each filter constituting the first pilot sequence and the filter bank should be considered. For example, information on a response (H) of a filter in a time area through which the first pilot symbol passes, information on a response (G) of a filter in a time area through which the second pilot symbol passes, and information on a first TDM pilot symbol (Z) which is converted from the first pilot symbol into that of a time area may be considered. Information on a second TDM pilot symbol (A) which is converted from the second pilot symbol into that of a time area may be obtained based on the above-mentioned information, and the second pilot sequence may be generated based on the information on the second TDM pilot symbol.

The synchronization control unit 120 may calculate sequence information which is a base in generating the second pilot sequence based on the first pilot sequence and values of each filter constituting the filter bank. Here, the sequence information may be transmitted to the sequence generating unit 110. The sequence information which is the base in generating the second pilot sequence may be calculated using a method such as Equations 2, 3 and 4.

Meanwhile, before calculating sequence attribute information, the synchronization control unit 120 may determine matching information of at least one first pilot symbol forming the first pilot sequence and at least one second pilot symbol forming the second pilot sequence. The matching unit 130 described later may match at least one first pilot symbol and at least one second pilot symbol to each of a plurality of subcarriers based on the matching information.

In an embodiment of the present invention, different pilot symbols may be mapped based on the filter. For example, the first pilot sequence and the auxiliary pilot sequence may be divided and mapped based on the filter. When each filter is divided into an odd number subcarrier index and an even number subcarrier index and is applied, the first pilot sequence and the second pilot sequence corresponding to each filer may be mapped to the odd number subcarrier or the even number subcarrier to which each filter corresponds. According to an embodiment, the synchronization control unit 120 may generate mapping information such that the first pilot symbol is mapped to the odd number subcarrier and the second pilot symbol is mapped to the even number subcarrier. Meanwhile, this is only an embodiment, the mapping information generated from the synchronization control unit 120 is not limited the above-mentioned embodiment. The synchronization control unit 120 may generate mapping information such that the second pilot symbol is mapped to the odd number subcarrier and the first pilot symbol is mapped to the even number subcarrier.

According to another embodiment, the synchronization control unit 120 may map the pilot symbols based on attributes of filters corresponding to each of the plurality of subcarriers. For example, when two different filters randomly correspond to each of the plurality of subcarriers, mapping information may be generated such that the first pilot symbol and the second pilot symbol are mapped to the subcarriers corresponding to each filter. In mapping step, the first pilot sequence may be preferentially mapped. When the first pilot sequence is preferentially mapped to a first group to which the first pilot sequence is mapped, since a phase change may not be considered, the preferentially mapping of the first pilot sequence to the first group to which the first pilot sequence is mapped is effective.

Meanwhile, in an embodiment of the present invention, the mapping information for the two filters are described as an example of the mapping information, the present invention is not limited thereto. According to another example, two or more filters may be used. When a plurality of pilot symbols are mapped with respect to two or more filters, mapping information which maps a pilot symbol (i.e., a symbol forming the first pilot sequence) including the synchronization information to the plurality of subcarriers so as to correspond to one filter and maps the remaining pilot symbols (i.e., symbols forming the auxiliary pilot sequence) to remaining subcarriers may be generated. At this time, the second pilot, which is defined as the auxiliary pilot, may be mapped to the plurality of subcarriers so as to correspond to all of the remaining filters except for the filter to which the pilot including the synchronization information corresponds, or may be mapped to the plurality of subcarriers so as to correspond one filter among the remaining filters.

The synchronization control unit 120 may expect the second pilot symbol overlapping any of at least one first pilot symbol included in the first pilot sequence, based on the mapping information. The synchronization control unit 120 may generate attribute information of the second pilot symbol capable of offsetting an effect due to a filter in a filter time response of any first pilot symbol. For example, a sum of the filter time response of any first pilot symbol and the filter time response of the expected second pilot symbol may determine the second pilot symbol which maintains the attribute in the time area of the first pilot sequence.

In the below, a conversion result of the first pilot symbol into the time area is referred to as a first TDM pilot symbol and a conversion result of the second pilot symbol into the time area is referred to as a second TDM pilot symbol. Meanwhile, a conversion result of the data symbol into the time area is referred to as a Time Division Multiplexer (TDM) data symbol.

The sequence generating unit 110 may generate the second pilot symbol according to the attribute information generated from the synchronization control unit 120.

The mapping unit 130 may map the first pilot symbol and the second pilot symbol to each of the plurality of subcarriers, based on the mapping information generated from the synchronization control unit 120.

FIGS. 4 and 5 are views for describing a method of mapping the sequence to the plurality of subcarriers according to an embodiment of the present invention.

According to an embodiment, the synchronization information generating unit 100 may map pilot symbols in consideration of the attribute of the filters to which each of the plurality of subcarriers corresponds. As described with reference to FIG. 1, the synchronization information generating unit 100 is included in the control unit of the data transmitting system. FIG. 4 illustrates a resource used in the FBMC system. Referring to FIG. 4, a vertical axis is a frequency axis, and the frequency axis may be divided into a plurality of carriers (referred to as subcarriers). A horizontal axis is a time axis, and may be divided into a plurality of unit times (i.e., symbols).

When the time axis is a standard, a data symbol or a pilot symbol including the synchronization sequence information may be mapped correspondingly to each symbol row. In an embodiment of the present invention, the symbol including the synchronization sequence information may include a plurality of pilot symbols. The plurality of pilot symbols may include a first pilot symbol and a second pilot symbol. The first pilot symbol and the second pilot symbol may be mapped to different subcarriers in the same symbol axis of an FBMC resource. The first pilot symbol may be zadoff-chu sequence. The second pilot symbol may be the auxiliary sequence. The auxiliary sequence may be used in compensating the loss generated due to the first pilot sequence passing through the filter bank.

Graphs of FIGS. 4 and 5 are views for describing waveforms in the time area, which are generated due to each first pilot symbol and second pilot symbol passing through corresponding filters.

Referring to FIG. 4, in the same symbol row of FIG. 4, the first pilot symbol and the second pilot symbol may be alternately allocated. For example, the first pilot symbols (e.g., zadoff-chu sequences) may be allocated to even number subcarriers among the plurality of subcarriers and the second pilot symbols (e.g., auxiliary sequences) may be allocated to odd number subcarriers among the plurality of subcarriers. Meanwhile, this is only an embodiment, and a method of mapping the sequence to the plurality of subcarriers according to an embodiment is not limited thereto.

According to another example, referring to FIG. 5, different pilot symbols may be successively allocated to the same symbol row. In the same symbol row, the first pilot symbol may be allocated to n successive subcarriers and the second pilot symbol may be allocated to next n successive subcarriers. At this time, the first pilot symbol and the second pilot symbol do not overlap. For example, in the plurality of subcarriers, the first pilot symbol may be mapped in intervals of three subcarriers, and the second pilot symbols may be mapped in intervals of next successive three subcarriers. As described with reference to FIGS. 4 and 5, a method of allocating the first pilot symbol and the second pilot symbol may be various.

Next, a method of calculating attribute information of the second pilot according to an embodiment of the present invention is described with reference to FIGS. 6 to 12.

FIG. 6 is a view for describing a method of calculating the attribute information of the second pilot in the synchronization information generating unit 100 according to an embodiment of the present invention.

Referring to FIG. 6, a waveform in a time area which is generated due to each of the first TDM pilot symbol and the second TDM pilot symbol passes through a corresponding filter is shown. According to an embodiment, the attribute information of the second pilot may be calculated based on the following Equation 1.

$$ZH_k + AG_k = Z \qquad \text{[Equation 2]}$$

$$A = \frac{Z(1 - H_k)}{G_k} \qquad \text{[Equation 3]}$$

In Equation 2, Z denotes the first TDM pilot symbol which is converted from the first pilot symbol into that in the time area, H denotes a response of the filter in the time area through which the first pilot symbol passes, A denotes the second TDM pilot symbol which is converted from the second pilot symbol into that in the time area, and G denotes a response of the filter in the time area through which the second pilot symbol passes.

FIG. 7 is a view for describing a method of drawing the auxiliary sequence according to an embodiment of the present invention. The method of drawing the auxiliary sequence will be described in more detail with reference to FIG. 7. The synchronization information generating unit 100 may select a random block 711 among blocks 710 in which the synchronization symbol is included. The synchronization information generating unit may calculate an equation, such as Equation 4 in which a transmission signal to be the synchronization symbol (Zm) with respect to the selected block 711.

$$Z_m H_2 + A_m G_2 + D^1{}_{m-1} H_4 + D^2{}_{m-1} G_4 + D^1{}_{m-2} H_6 + D^2{}_{m-2} G_6 = Zm \qquad \text{[Equation 4]}$$

In Equation 4, Zm denotes the first TDM pilot symbol which is converted from the first pilot symbol into that in the time area, Hn denotes a response of the filter in the time area through which the first pilot symbol passes, Am denotes the second TDM pilot symbol which is converted from the second pilot symbol into that in the time area, and Gn denotes a response of the filter in the time area through which the second pilot symbol passes.

Equation 4 may be simply expressed as Equation 5 by substituting data related element with interference element.

$$ZH_i + AG_i + \sum_{k=1}^{4} I_k = Z \qquad \text{[Equation 5]}$$

In addition, the auxiliary sequence may be calculated by Equation 6.

$$A = \frac{Z(1 - H_i) - \sum_{k=1}^{4} I_k}{G_i} \qquad \text{[Equation 6]}$$

Next, a serial parallel conversion and a synchronization information mapping may be performed using the drawn auxiliary sequence. Meanwhile, when it is considered that there is little effect of the interference in Equation 6 and thus it is assumed that the interference element is 0, Equation 6 is the same as Equation 3.

Next, a method of drawing the auxiliary sequence in the FBMC system using the Offset Quadrature Amplitude Modulation (OQAM) is described. FIG. 8 is a view illustrating a method of mapping a frequency area signal of the FBMC system using the Offset Quadrature Amplitude Modulation (OQAM) according to an embodiment of the present invention and a symbol formation in the time area according to the method. A symbol forming interval in the FBMC system using the OQAM is ½ time of a symbol forming interval in an existing FBMC system based on a Quadrature Amplitude Modulation (QAM). In addition, as shown in FIG. 8, input values mapped to each subcarrier are configured such that a phase difference between an adjacent subcarrier and an adjacent symbol corresponds to ρ/2 as a real number section and an imaginary section according to a signal mapping method. At this time, an even filter and an odd filter use the same filter.

FIG. 9 is a view illustrating a process of creating the synchronization symbol Z using the auxiliary sequence in the OQAM based FBMC. Referring to FIG. 8, the number of symbols that are overlapped and added is twice of a filter coefficient (K), and a synchronization symbol forming unit may be determined as the symbol forming interval. At this time, a TDM symbol of a k-th sub symbol interval of an m-th symbol among the overlapped symbols may be expressed as $S_{(k,m)} = (D_m^1 + (-1)^k D_m^2) H_k$. At this time, an equation for creating the synchronization symbol Z with reference to Equation 4 is the same as following.

$$Z = \sum_{i=0}^{K} [S_{(2i, 2m+k-2i)} + jS_{(2i+1, 2m+k-2i-1)}] \qquad \text{[Equation 7]}$$

In the OQAM based FBMC system, in order to make the synchronization symbol Z, a pair of auxiliary sequences is mapped to the subcarrier. A first auxiliary sequence is mapped to even number subcarriers of a 2m-th symbol, and a second auxiliary sequence is mapped to even number subcarriers of a (2m+1)-th symbol. At this time, when the pair of auxiliary sequences are substituted to Equation 6 and developed, the following equations are obtained.

$$Z = \qquad \text{[Eqution 8]}$$
$$A^1 H_k + jA^2 H_{k-1} + \frac{[(-1)^k jD_{2m}^2 H_k - (-1)^{k-1} jD_{2m+1}^2 H_{k-1}]}{U^1} +$$
$$\frac{\sum_{i=0, i \neq k}^{K} [S_{(2i, 2m+k-2i)} + S_{(2i, 2m+k-2i)}]}{U^2}$$

-continued $$A^1 H_k + jA^2 H_{k-1} = \underline{Z - U^1 - U^2} \over Z$$ [Equation 9]

In Equation 9, $A^1$ and $A^2$ denote TDM symbols of the pair of auxiliary sequences, $U^1$ denotes a TDM symbol of data mapped to the odd number subcarrier of the 2m-th and (2m+1)-th symbols, and $U^2$ denotes TDM symbols of adjacent data overlapped the symbol to which the auxiliary sequence is mapped. At this time, since input values of the even number subcarrier of the frequency area should be a real number section (or an imaginary number section), a configuration value of a pair of induced auxiliary sequences also should be a real number section. To this end, $A^1$ and $A^2$ should satisfy a conjugate symmetry condition. If a simultaneous linear equation for $A^1$ and $A^2$ is solved based on the conjugate symmetry condition and Equation 9, values in the time area of the pair of auxiliary sequences may be drawn by Equation 8.

$$A^1(i) = \begin{cases} \dfrac{\text{Re}\{Z(i)\}}{H(kN/2+i)}, & i = 0, \dfrac{N}{4} \\[6pt] \dfrac{H(kN/2-i)Z(i) + H((k-1)N/2+i)Z(N/2-i)}{H(kN/2+i)H(kN/2-i) + H((k-1)N/2+i)H((k+1)N/2-i)}, & i = 1, \ldots, \dfrac{N}{4}-1 \\[6pt] \{A^1(N/2-i)\}^*, & i = \dfrac{N}{4}+1, \\ & \ldots, \dfrac{N}{2}-1 \end{cases}$$ [Equation 10]

$$A^2(i) = \begin{cases} \dfrac{\text{Im}\{Z(i)\}}{H((k-1)N/2+i)}, & i = 0, \dfrac{N}{4} \\[6pt] \dfrac{-H((k+1)N/2-i)Z(i) + H(kN/2+i)Z(N/2-i)}{H(kN/2+i)H(kN/2-i) + H((k-1)N/2+i)H((k+1)N/2-i)}, & i = 1, \ldots, \dfrac{N}{4}-1 \\[6pt] \{A^2(N/2-i)\}^*, & i = \dfrac{N}{4}+1, \\ & \ldots, \dfrac{N}{2}-1 \end{cases}$$

In Equation 10, Re{.} and Im{.} are operators detecting only the real number section and the imaginary number section, N denotes a whole length, and { }* is an operator for a complex number conjugate. When a Fourier transform is performed based on Equation 8, the pair of auxiliary sequences in the frequency area may be drawn.

FIG. 10 is a view illustrating a process of making the synchronization symbol Z without a limit of a length using the auxiliary sequence in the OQAM based FBMC. For example, a relation equation of each symbol overlapped and added in a case wherein the synchronization symbol Z of which the length is longer twice than that in the case of FIG. 9 is described. The relation equation may be induced to Equation 7 as each of a front half of Z and a rear half of Z. At this time, a total of four different auxiliary sequence groups $A^1$, $A^2$, $A^3$ and $A^4$ are mapped to the even number subcarrier and the odd number subcarrier of the 2m-th and the (2m+1)-th symbols, respectively, and two linear equations having four variables may be induced based on Equation 9. At this time, all $A^1$, $A^2$, $A^3$ and $A^4$ are have a conjugate symmetry attribute, a simultaneous linear equation is solved by applying the conjugate symmetry attribute, and thus each auxiliary sequence is drawn. The method is not limited to the synchronization symbol having the length longer twice. When the synchronization symbol having the length longer L times is generated, the synchronization symbol may be drawn in the same manner as the above method by configuring L relation equations and 2L auxiliary sequence groups. In the same manner, the number of the auxiliary sequences may be determined according to the length of the synchronization signal. In addition, the determined auxiliary sequence may be mapped to the subcarrier based on the signal mapping method of the OQAM.

Next, a method of selecting a target block of which interference element is low is described with reference to FIG. 11. In Equation 2, k denotes a block number of a block having a time response waveform of the first pilot. Since a first pilot symbol overlaps an adjacent data symbol, an optimal k for less interference of the data symbol should be selected. In order to select the block k of which the interference element of the data symbol is the least, a Block Signal power to Interference power Ratio (BSIR) is defined. After calculating the BSIR in each block, the BSIRs are compared, and the number of the block having the largest BSIR is selected as k. When a symbol including the first pilot symbol is the target symbol, BSIR indicates power of the target symbol compared to a sum of power of a data symbol (i.e., a data symbol overlapped the first pilot symbol) acting as an interference except for the target symbol. That is, a block of which the BSIR, that is the power of the target symbol (k) compared to the interference symbol, is the maximum is selected, and thus the target block of which the interference element is the least may be selected.

The BSIR may be determined using a method such as Equation 11.

$$BSIR_3 = \frac{\|Z_m H_3\| + \|A_m G_3\|}{\|D^1_{m-1} H_5\| + \|D^2_{m-1} G_5\| + \|D^1_{m+1} H_1\| + \|D^2_{m+1} G_5\|}$$ [Equation 11]

Next, a method of calculating the auxiliary sequence more accurately by approximating the interference element to an average value is described.

According to another example of FIG. 12, if an adjacent data symbol is approximated with respect to the selected k-th block, more accurately second pilot symbol may be calculated based on the following Equation 8.

$$A = \frac{Z\left(1 - H_k - \sum_{i=1}^{K-1} H_{mod(k+2+i, sK)} + G_{mod(k+2i, sK)}\right)}{G_k}$$ [Equation 12]

The data among interference elements may be randomly changed. When it is assumed that an average of data power in the block including the synchronization information is the same, a shape of the interference symbol may be determined using only filter power. Thus, FIG. 11 provides a method of drawing the auxiliary symbol after drawing an approximate value of the interference using the filter power.

The synchronization information generating unit 100 adds a filter response of the first TDM pilot symbol and a filter response of the second TDM pilot symbol, and thus the synchronization information generating unit 100 may calculate attribute information on the second TDM pilot symbol facilitating the calculation of the first TDM pilot symbol. The synchronization information generating unit 100 may generate the second pilot symbol based on the calculated attribute information.

FIG. 13 is a flowchart for describing a method of generating the synchronization information according to an embodiment of the present invention.

In step 1310, the synchronization information generating unit 100 obtains information on a plurality of filters included in the data transmitting system 10. The information on the plurality of filters may include the information on the response (H) of the filter in the time area through which the first pilot symbol passes and the response (H) of the filter in the time area through which the second pilot symbol passes. In addition, the synchronization information generating unit 100 may obtain the information on the first TDM pilot symbol (Z) which is converted from the first pilot symbol into that of the time area.

In step 1320, the synchronization information generating unit 100 generates the second pilot sequence based on the information on the first pilot sequence and the obtained information on the plurality of filters. The information on the second TDM pilot symbol (A) which is converted from the second pilot symbol into that of the time area may be obtained based on the first pilot sequence and the information on the plurality of filters. The second pilot sequence may be generated based on the information on the second TDM pilot symbol. A specific method of generating the second sequence refers to the descriptions of FIGS. 6 to 12.

In step S1330, the synchronization information generating unit 100 maps the first pilot sequence and the second pilot sequence to at least one data symbol transmitted from a data transmitter. A mapping method refers to the descriptions of FIGS. 4 and 5.

FIG. 14 is a flowchart for describing a method of generating the synchronization information and a method of transmitting data of the present invention. FIG. 15 is a view for describing a method of generating the synchronization information and a method of transmitting data according to an embodiment of the present invention.

Referring to FIGS. 14 and 15, the data transmitting device may generate data to be transmitted to the data receiving device, and may perform a constellation mapping to the generated data (S1410). The data transmitting device may generate data to be transmitted to the data receiving system. The data is a bit type of data, and may be a bit stream. The data transmitting device modulates the bit type of data to data according to each constellation.

The data transmitting device may perform a serial parallel conversion (S1420). The data transmitting device converts a serial data row into a parallel data structure for a next operation.

The data transmitting device may generate the synchronization sequence (S1430). The synchronization sequence may be the aforementioned first pilot sequence. The synchronization sequence is a sequence capable of directly estimating the synchronization using the self correlation attribute.

The data transmitting device may generate the auxiliary sequence (S1440). The auxiliary sequence is used together with the first pilot sequence, and is a sequence to help the first pilot sequence maintains the correlation attribute in the time area. A method of generating the auxiliary sequence may use the method described with reference to FIGS. 6 to 12.

The attribute of the sequence correlation uses an attribute in which a similarity between oneself and the same sequence is 1 and a similarity between oneself and a different sequence is 0, and is effective in estimating synchronization. In the present invention, as described above, two types of pilot sequences may be used. The first pilot sequence may be a synchronization sequence. The first pilot sequence is a sequence capable of directly estimating synchronization using a self correlation attribute. The second pilot sequence or the auxiliary sequence is used together with the first pilot sequence, and is a sequence to help the first pilot sequence maintains the correlation attribute in a time area.

Meanwhile, in order to generate the second pilot sequence for offsetting a loss of an attribute, which is generated due to the first pilot sequence passing through the filter bank, all values of each filter constituting the first pilot sequence and the filter bank should be considered. For example, information on a response (H) of a filter in a time area through which the first pilot symbol passes, information on a response (H) of a filter in a time area through which the second pilot symbol passes, and information on a first TDM pilot symbol (Z) which is converted from the first pilot symbol into that of a time area may be considered. Information on a second TDM pilot symbol (A) which is converted from the second pilot symbol into that of a time area may be obtained based on the above-mentioned information, and the second pilot sequence may be generated based on the information on the second TDM pilot symbol.

The data transmitting device may map the synchronization sequence and the auxiliary sequence to the generated data (S1450). Referring to FIG. 15, for example, FIG. 15 illustrates an example in which a serial parallel conversion is performed and the synchronization information is mapped. The synchronization information may be mapped to a first group (i.e., a subcarrier group in which first filter is used) using the synchronization sequence and the synchronization information may be mapped to a second group (i.e., a subcarrier group in which second filter is used) using the auxiliary sequence.

The data transmitting device may perform the IFFT on the mapped signal row (S1460). For example, the data transmitting device may perform the IFFT as described in FIG. 15. The data transmitting device may convert a parallel structure of signal row output after the IFFT into a serial structure of signal row.

The data transmitting device may perform a filtering using the filter (S1470). The FBMC system may overlap a signal and symbols to which different filter coefficients are multiplied, and may transmit the overlapped signal and symbols through the filter process. An m-th symbol row for each group may be calculated through the filtering. A filter bank block for the filtering may have an odd number filter and an even number filter for a transmitting end, and may operate with the signal row before or after the IFFT block for the signal synthesis.

The data transmitting device may transmit the signal on which the process is performed to the data receiving device (S1480). In the FBMC, the signal row may be overlapped and transmitted as shown in FIG. 15. At least one block of a block including the synchronization information among the overlapped signals may have a synchronization correlation attribute, and the receiving device may obtain the synchronization through the synchronization correlation attribute.

FIG. 16 is a block diagram for describing the synchronization information generating unit 100 in the data transmitting system 10 according to an embodiment of the present invention. In the synchronization information generating unit 100 shown in FIG. 16, only configuration elements related to the present embodiment are shown. Thus, a person having an ordinary skill in a technical field related to the present embodiment may understand that other common configuration elements in addition to the configuration elements shown in FIG. 16 may be included.

Referring to FIG. 16, the synchronization information generating unit 100, according to another embodiment may include the sequence generating unit 110, the synchronization control unit 120, the mapping unit 130 and a memory 140.

The sequence generating unit 110 generates the synchronization information on at least one data symbol transmitted from the data transmitting system 10 to the data receiving system 20. Here, the synchronization information may include a plurality of pilot sequences.

Meanwhile, the sequence generating unit 110 of FIG. 16 may correspond to the sequence generating unit 110 of FIG. 3. FIG. 3 is a data independent system and FIG. 13 is a data dependent system.

The synchronization control unit 120 may calculate sequence attribute information which is a base in generating the second pilot sequence based on the attribute of the first pilot sequence and attributes of each filter constituting the filter bank. Here, the sequence attribute information may be transmitted to the sequence generating unit 110.

Meanwhile, before the synchronization control unit 120 calculates the sequence attribute information, the synchronization control unit 120 may determine matching information of the at least one first pilot symbol forming the first pilot sequence and at least one second pilot symbol forming the second pilot sequence.

Meanwhile, the synchronization control unit 120 of FIG. 16 may correspond to the synchronization control unit 120 of FIG. 3.

The mapping unit 130 may map the first pilot symbol and the second pilot symbol to each of the plurality of subcarriers, based on the mapping information generated from the synchronization control unit 120.

Meanwhile, the mapping unit 130 of FIG. 16 may correspond to the mapping unit 130 of FIG. 3.

The memory 140 may include information at least one data symbol transmitted from the data transmitting system 10 to the receiving system 20. For example, the memory 140 may include information on at least one TDM data symbol overlapped the first TDM pilot symbol and the second TDM pilot symbol.

The memory 140 may transmit the information on at least one TDM data symbol overlapped the first TDM pilot symbol and the second TDM pilot symbol.

The synchronization control unit 120 may calculate attribute information of the second pilot symbol in consideration of the received information on at least one TDM data symbol. For example, the synchronization control unit 120 may determine the second pilot symbol which enables a sum of the filter time response of any first pilot symbol, the filter time response of the expected second pilot symbol and the filter time response of at least one TDM data symbol to maintain the attribute in the time area of the first pilot sequence. Meanwhile, in the above, each of the elements configuring the synchronization information generating unit 100 is divided into the sequence generating unit 110, the synchronization control unit 120, the mapping unit 130 and the memory 140, and the functions and operations of each elements are described, but this is an embodiment, and the elements configuring the synchronization information generating unit 100 is not limited thereto. That is, the operations performed by the sequence generating unit 110, the synchronization control unit 120, the mapping unit 130 and the memory 140 may be performed by the synchronization information generating unit 100, and may be performed by a control unit including the synchronization information generating unit 100.

FIG. 17 is a flowchart for describing a method of generating the synchronization information by the synchronization information generating unit 100 according to an embodiment of the present invention.

In step S1710, the synchronization information generating unit 100 obtains the information on the plurality of filters included in the data transmitting system 10. The information on the plurality of filters may include information on a response (H) of a filter in a time area through which the first pilot symbol passes and information on a response (G) of a filter in a time area through which the second pilot symbol passes.

In step S1720, the synchronization information generating unit 100 generates the first pilot sequence for detecting the synchronization information on at least one data symbol.

In step S1730, the synchronization information generating unit 100 generates the second pilot sequence based on the generated first pilot sequence, the data symbol and the attribute of the filter. Information on a second TDM pilot symbol (A) which is converted from the second pilot symbol into that of a time area may be obtained based on the information first pilot sequence and the plurality of filters, and the second pilot sequence may be generated based on the obtained information on the second TDM pilot symbol.

In step S1740, the synchronization information generating unit 100 maps the first pilot sequence and the second pilot sequence to at least one data symbol. In an embodiment of the present invention, the auxiliary pilot sequence (i.e., the second pilot sequence) for compensating the first pilot sequence may be generated and mapped. It may facilitate having the first pilot sequence attribute in the time area using the auxiliary pilot sequence. In addition, in the case of the sequence mapping, the synchronization sequence and the auxiliary sequence may be mapped to filters, respectively. A method of mapping the first pilot sequence and the second pilot sequence may use the method described in FIGS. 4 and 5.

FIG. 18 is a block diagram of the synchronization unit 200 in the data receiving system 20 according to an embodiment of the present invention. In the synchronization unit 200 shown in FIG. 15, only configuration elements related to the present embodiment are shown. Thus, a person having an ordinary skill in a technical field related to the present embodiment may understand that other common configuration elements in addition to the configuration elements shown in FIG. 16 may be included.

Referring to FIG. 18, the synchronization unit 200 according to an embodiment of the present invention may include sequence information obtaining unit 210, a correlation coefficient detecting unit 220 and a synchronization information detecting unit 230.

The sequence information obtaining unit 210 obtains the information on the first pilot sequence from the data transmitting system 10 according to an embodiment.

The correlation coefficient detecting unit 220 detects each correlation coefficient between the TDM pilot symbols received from the data transmitting system 10 and the first TDM pilot symbols generated based on the information on the first pilot sequence, based on the obtained information on the first pilot sequence.

The synchronization information detecting unit 230 detects point of which a correlation coefficient value is the highest, as a synchronization start point, based on information on the detected correlation coefficients.

Meanwhile, in the above, the elements configuring the synchronization unit 100 are divided into the sequence information obtaining unit 210, the correlation coefficient detecting unit 220 and the synchronization information detecting unit 230, and the functions and operations of each configuration element are described. But, this is only an embodiment, and elements configuring the synchronization unit 100 are not limited thereto. That is, the operations performed by the sequence information obtaining unit 210, the correlation coefficient detecting unit 220 and the synchronization information detecting unit 230 may be performed by the synchronization unit 200, and may be performed by a control unit including the synchronization unit 200.

FIG. 19 is a flowchart for describing a method of detecting the synchronization start point in the synchronization unit according to an embodiment of the present invention.

In step S1910, the synchronization unit 200 obtains the information on the first pilot sequence for detecting the synchronization information on at least one symbol data. The information on the first pilot sequence may be obtained from the data transmitting device. In addition, the information on the first pilot sequence may be received from a higher rank node, or may be stored in the receiving device as predetermined information. The information on the first pilot sequence may include information for generating the TDM pilot symbol received from the data transmitting device and the first TDM pilot symbol used in detecting the correlation coefficient of the first pilot sequence.

In step S1920, the synchronization unit 200 detects each correlation coefficient between the TDM pilot symbols received from the data transmitting system and the first TDM pilot symbols generated based on the information on the first pilot sequence.

In step S1930, the synchronization unit 200 detects the point of which the correlation coefficient value is the highest, as the synchronization start point, based on the information on the detected correlation coefficients.

The attribute of the sequence correlation uses an attribute in which a similarity between oneself and the same sequence is 1 and a similarity between oneself and a different sequence is 0. The data receiving device may detect the point of which the correlation coefficient value is the highest, as the synchronization start point, using the TDM symbol of the first pilot sequence received from the data transmitting device and the first TDM symbol generated from the information on the first sequence. In the FBMC system, there has been a problem in which a correlation attribute is changed by an effect of a filter in a filtering process or the correlation attribute is maintained by an effect of interference. In the present invention, a mapped signal is transmitted using the auxiliary sequence for resolving the problem in which the correlation attribute is changed according to the filtering and the effect of the interference when the signal is transmitted from the data transmitting device. Thus, the data receiving device receiving the signal to which the auxiliary sequence is applied may easily detect the synchronization start point using the correlation coefficient.

FIG. 20 is a flowchart for describing a method of detecting the synchronization start point and a method of receiving data according to an embodiment of the present invention. FIG. 21 is a view for describing a method of detecting the synchronization start point and a method of receiving data according to an embodiment of the present invention.

Referring to FIGS. 20 and 21, the data receiving device may receive a signal from the data transmitting device (S2110). The received signal may be a signal of which a synchronization start point is determined by the TDM symbol of the first pilot sequence and the TDM symbol of the auxiliary pilot sequence in the data transmitting device.

The data receiving device may perform a synchronization symbol correlation operation on the received signal (S2120). The synchronization symbol correlation operation may be performed using the received signal and the TDM symbol of the first pilot sequence. The correlation operation may be performed on each block including the synchronization information, among the received signals. A value of which a correlation operation is the largest among a plurality of blocks may be determined as the synchronization start point. For example, referring to FIG. 18, a correlation check is performed on the plurality of blocks using Z that is the TDM symbol of the first pilot sequence. If, a correlation operation result of the q-th block is the highest, the q-th block may be determined as the synchronization start point.

The data receiving device may identify a frame start point of a frame by determining the synchronization start point (S2130). The data receiving device may identify the frame start point using the determined synchronization start point and information on the q-th block. Referring to FIG. 21, the frame start point may be identified.

The data receiving device may filter a receiving end at the frame start point (S2141). The data receiving device may perform the FFT from the frame start point (S2142). In addition, the data receiving device may perform a frequency area similarity operation based on a result of the TTF performance (S2143). The data receiving device may correct a carrier frequency and an error based on a result of the frequency area similarity operation (S2144). The data receiving device may perform an interger-times frequency error compensation (S2155).

The data receiving device may identify a next data start point from the identified frame start point (S2151). Referring to FIG. 21, the data start point of the frame is shown. The data receiving device may perform a filtering on a receiving end from the identified data start point (S2152).

The data receiving device may perform the FFT (S2160).

The data receiving device may perform a parallel serial conversion and a constellation de-mapping based on an FFT receiving result (S2170). The data receiving device may recover data received from the data transmitting device based on results of the parallel serial conversion and the constellation de-mapping (S2180).

FIG. 22 is graphs the synchronization start point and the synchronization frequency detected from the synchronization unit according to an embodiment of the present invention. Referring to FIG. 22, a graph illustrating a result of the correlation operation is shown. In FIG. 22, a peak is generated at a specific time. Thus, according to an embodiment of the present invention, a sequence of which correlation attribute is good in the FBMC system is provided, and thus a method of mapping a signal row and a method of operating an auxiliary sequence may be provided such that a synchronization operation is possible in the FBMC system.

Although the present invention has been described by the restricted embodiments and the drawings as described above, the present invention is not limited to the aforementioned embodiments and various modifications and alterations can be made from the descriptions by those skilled in the art to which the present invention pertains. Therefore, the scope of the present invention should not be defined as being limited to the embodiments, but should be defined by the appended claims and equivalents thereof.

The invention claimed is:

1. A method in a communication system, the method comprising:
    generating a first pilot sequence including synchronization information;
    selecting a random block among a plurality of blocks in which the first pilot sequence is included;
    determining an auxiliary symbol of an auxiliary sequence based on an average power of the selected random block;
    generating the auxiliary sequence related to a correlation attribute of the first pilot sequence;
    mapping the first pilot sequence and the auxiliary sequence to a plurality of subcarriers in at least one data symbol; and
    transmitting data on the at least one data symbol to which the first pilot sequence and the auxiliary sequence are mapped,
    wherein the selected random block is a block of which a transmission power value of a target pilot sequence among the plurality of blocks is largest.

2. The method as claimed in claim 1, wherein the communication system is a Filter Bank MultiCarrier (FBMC) system.

3. The method as claimed in claim 1, wherein the auxiliary sequence offsets a filter response generated in the first pilot sequence by a plurality of filters.

4. The method as claimed in claim 1, wherein the mapping comprises mapping the first pilot sequence to a specific filter and mapping the auxiliary sequence to a filter different from the specific filter.

5. The method as claimed in claim 1, wherein the mapping comprises mapping a pair of auxiliary sequences to the plurality of subcarriers, based on Offset Quadrature Amplitude Modulation (OQAM).

6. The method as claimed in claim 5, wherein an OQAM mapping method inputs a real number section or an imaginary number section such that a phase difference between an adjacent subcarrier and an adjacent symbol corresponds to $\pi/2$.

7. The method as claimed in claim 5, further comprising:
    determining a number of the auxiliary sequences according to a length of the synchronization information,
    wherein the mapping comprises mapping the determined auxiliary sequence to the plurality of subcarriers based on the Offset Quadrature Amplitude Modulation (OQAM).

8. An apparatus in a communication system, the apparatus comprising:
    a transceiver configured to transmit and receive a signal; and
    at least one processor configured to:
    generate a first pilot sequence including synchronization information,
    select a random block among a plurality of blocks in which the first pilot sequence is included,
    determine an auxiliary symbol of an auxiliary sequence based on an average power of the selected random block,
    generate the auxiliary sequence related to a correlation attribute of the first pilot sequence,
    map the first pilot sequence and the auxiliary sequence to a plurality of subcarriers in at least one data symbol, and
    transmit data on the at least one data symbol to which the first pilot sequence and the auxiliary sequence are mapped,
    wherein the selected random block is a block of which a transmission power value of a target pilot sequence among the plurality of blocks is largest.

9. The apparatus as claimed in claim 8, wherein the auxiliary sequence offsets a filter response generated in the first pilot sequence by a plurality of filters.

10. The apparatus as claimed in claim 8, wherein the at least one processor is further configured to map the first pilot sequence to a specific filter and map the auxiliary sequence to a filter different from the specific filter.

11. The apparatus as claimed in claim 8, wherein the at least one processor is further configured to map a pair of auxiliary sequences to the plurality of subcarriers, based on Offset Quadrature Amplitude Modulation (OQAM).

* * * * *